US012620594B1

(12) United States Patent
Norris et al.

(10) Patent No.: US 12,620,594 B1
(45) Date of Patent: May 5, 2026

(54) SECONDARY PARTICLE COMPOSITE GROUP IVA MATERIALS

(71) Applicant: KRATOS LLC, Irmo, SC (US)

(72) Inventors: Jeff A. Norris, Irmo, SC (US); Timothy D. Newbound, Chelsea, MI (US); Anton Kornberg, Irmo, SC (US)

(73) Assignee: Kratos LLC, Irmo, SC (US)

( * ) Notice: Subject to any disclaimer, the term of this patent is extended or adjusted under 35 U.S.C. 154(b) by 317 days.

(21) Appl. No.: 18/457,168

(22) Filed: Aug. 28, 2023

Related U.S. Application Data

(60) Provisional application No. 63/373,656, filed on Aug. 26, 2022, provisional application No. 63/452,993, filed on Mar. 17, 2023.

(51) Int. Cl.

| | |
|---|---|
| ***H01M 4/60*** | (2006.01) |
| ***C08L 33/20*** | (2006.01) |
| ***C08L 65/00*** | (2006.01) |
| ***H01B 1/12*** | (2006.01) |
| *H01M 4/02* | (2006.01) |

(52) U.S. Cl.
CPC ............. *H01M 4/604* (2013.01); *C08L 33/20* (2013.01); *C08L 65/00* (2013.01); *H01B 1/127* (2013.01); *H01M 4/608* (2013.01); *C08L 2203/20* (2013.01); *C08L 2205/03* (2013.01); *C08L 2207/53* (2013.01); *C08L 2312/02* (2013.01); *H01M 2004/027* (2013.01)

(58) Field of Classification Search
CPC ......... H01B 1/00; H01B 1/127; H01M 4/602; H01M 4/604; H01M 4/606; H01M 4/608; C08L 33/20
See application file for complete search history.

(56) References Cited

U.S. PATENT DOCUMENTS 6,197,219 B1 * 3/2001 Foulger .................... H01B 1/24 252/511
7,989,110 B2 8/2011 Cavaille et al.
8,435,676 B2 5/2013 Zhamu et al.
8,822,074 B2 9/2014 Wakizaka et al.
8,936,874 B2 1/2015 Shi et al.
(Continued)

FOREIGN PATENT DOCUMENTS

CN 102956925 B 8/2014
CN 103305965 B 8/2016
(Continued)

OTHER PUBLICATIONS

Kausar "Polyacrylonitrile-based nanocomposite fibers: A review of current developments", Journal of Plastic Film & Sheeting 2019, vol. 35(3) 295-316 2019.*

(Continued)

*Primary Examiner* — Mark Kopec
(74) *Attorney, Agent, or Firm* — Michael Best & Friedrich LLP

(57) ABSTRACT

Exemplary secondary particles may include a porous polymer matrix comprising polyacrylonitrile (PAN) and polypyrrole (PPy), and a plurality of submicron-sized primary particles dispersed in the porous polymer matrix. The plurality of submicron-sized primary particles may comprise at least one of: carbon (C), silicon (Si), germanium (Ge), tin (Sn), or an alloy of a Group IVA element.

16 Claims, 22 Drawing Sheets

(56) References Cited

U.S. PATENT DOCUMENTS

| | | | | |
|---|---|---|---|---|
| 9,450,229 | B2 | 9/2016 | Uwai et al. | |
| 9,461,304 | B2 | 10/2016 | Newbound et al. | |
| 9,461,309 | B2 | 10/2016 | Newbound et al. | |
| 9,543,583 | B2 | 1/2017 | Nakamura et al. | |
| 9,680,150 | B2 | 6/2017 | Yamamoto | |
| 9,941,511 | B2 | 4/2018 | Ohsawa et al. | |
| 9,941,512 | B2 | 4/2018 | Ohsawa et al. | |
| 10,084,182 | B2 | 9/2018 | Pan et al. | |
| 10,170,789 | B2 | 1/2019 | Zhamu et al. | |
| 10,211,454 | B2 | 2/2019 | Newbound et al. | |
| 10,211,455 | B2 | 2/2019 | Pan et al. | |
| 10,256,473 | B2 | 4/2019 | Ohsawa et al. | |
| 10,283,769 | B2 | 5/2019 | Yamamoto et al. | |
| 10,374,225 | B2 | 8/2019 | Yamamoto et al. | |
| 10,411,264 | B2 | 9/2019 | Pan et al. | |
| 10,439,224 | B2 | 10/2019 | Nagano | |
| 10,511,004 | B2 | 12/2019 | Kusachi et al. | |
| 10,601,034 | B2 | 3/2020 | Zhamu et al. | |
| 10,629,894 | B2 * | 4/2020 | Fanous ............. | H01M 10/0525 |
| 10,658,674 | B2 | 5/2020 | Ohsawa et al. | |
| 10,707,493 | B2 | 7/2020 | Ohsawa et al. | |
| 10,734,642 | B2 | 8/2020 | Zhamu et al. | |
| 10,797,313 | B2 | 10/2020 | Zhamu et al. | |
| 10,818,926 | B2 | 10/2020 | Pan et al. | |
| 10,873,088 | B2 | 12/2020 | He et al. | |
| 10,903,488 | B2 | 1/2021 | Ohsawa et al. | |
| 10,916,766 | B2 | 2/2021 | Zhamu et al. | |
| 10,930,920 | B2 | 2/2021 | Minami et al. | |
| 10,957,910 | B2 | 3/2021 | Jang | |
| 10,964,934 | B2 | 3/2021 | Ohsawa et al. | |
| 10,964,936 | B2 | 3/2021 | Zhamu et al. | |
| 10,971,722 | B2 | 4/2021 | Zhamu et al. | |
| 10,971,724 | B2 | 4/2021 | Jang | |
| 10,985,373 | B2 | 4/2021 | Pan et al. | |
| 11,005,094 | B2 | 5/2021 | Pan et al. | |
| 11,005,097 | B2 | 5/2021 | Newbound et al. | |
| 11,024,835 | B2 | 6/2021 | Minami et al. | |
| 11,145,892 | B2 | 10/2021 | Pan et al. | |
| 11,239,460 | B2 | 2/2022 | Pan et al. | |
| 11,289,731 | B2 | 3/2022 | He et al. | |
| 11,302,915 | B2 | 4/2022 | Tanaka et al. | |
| 11,394,058 | B2 | 7/2022 | Zhamu et al. | |
| 11,456,447 | B2 | 9/2022 | Doi et al. | |
| 11,469,415 | B2 | 10/2022 | Jang | |
| 11,522,178 | B2 | 12/2022 | Newbound et al. | |
| 11,637,280 | B2 | 4/2023 | Newbound et al. | |
| 11,637,291 | B2 | 4/2023 | He et al. | |
| 11,637,329 | B2 | 4/2023 | Jang | |
| 11,652,211 | B2 | 5/2023 | Pan et al. | |
| 11,652,241 | B2 | 5/2023 | Kaburagi et al. | |
| 11,658,343 | B2 | 5/2023 | Yoda et al. | |
| 11,664,489 | B2 | 5/2023 | Ohsawa et al. | |
| 11,664,502 | B2 | 5/2023 | Nakano et al. | |
| 11,677,101 | B2 | 6/2023 | He et al. | |
| 12,046,745 | B2 | 7/2024 | Newbound et al. | |
| 2012/0034512 | A1 | 2/2012 | Zhang et al. | |
| 2012/0189877 | A1 | 7/2012 | Ferraris et al. | |
| 2014/0057168 | A1 | 2/2014 | Newbound et al. | |
| 2014/0134499 | A1 | 5/2014 | Newbound et al. | |
| 2015/0243973 | A1 | 8/2015 | Newbound et al. | |
| 2016/0359162 | A1 | 12/2016 | Kim et al. | |
| 2017/0149056 | A1 | 5/2017 | Newbound et al. | |
| 2017/0149066 | A1 | 5/2017 | Newbound et al. | |
| 2018/0287142 | A1 | 10/2018 | Zhamu et al. | |
| 2018/0316014 | A1 * | 11/2018 | Dash .................. | H01M 4/0402 |
| 2019/0190063 | A1 | 6/2019 | Gogyo et al. | |
| 2019/0214642 | A1 | 7/2019 | Newbound et al. | |
| 2019/0260020 | A1 | 8/2019 | Yamamoto et al. | |
| 2019/0267662 | A1 | 8/2019 | Zhamu et al. | |
| 2019/0267663 | A1 | 8/2019 | Zhamu et al. | |
| 2019/0319263 | A1 | 10/2019 | Zhamu et al. | |
| 2019/0363349 | A1 | 11/2019 | Newbound et al. | |
| 2019/0372174 | A1 | 12/2019 | He et al. | |
| 2020/0044240 | A1 | 2/2020 | Newbound et al. | |
| 2020/0106089 | A1 | 4/2020 | Doye et al. | |
| 2020/0185706 | A1 | 6/2020 | Tanaka et al. | |
| 2020/0219669 | A1 | 7/2020 | Doi et al. | |
| 2020/0259170 | A1 | 8/2020 | Newbound et al. | |
| 2020/0287207 | A1 | 9/2020 | Jang | |
| 2020/0295346 | A1 | 9/2020 | Tanaka et al. | |
| 2020/0295359 | A1 | 9/2020 | Otsuka et al. | |
| 2020/0313170 | A1 | 10/2020 | Zhamu et al. | |
| 2020/0358081 | A1 | 11/2020 | Lin et al. | |
| 2020/0358084 | A1 | 11/2020 | Jang | |
| 2020/0358088 | A1 | 11/2020 | Lin et al. | |
| 2020/0365881 | A1 | 11/2020 | Tanaka et al. | |
| 2021/0111389 | A1 | 4/2021 | Doi et al. | |
| 2021/0218049 | A1 | 7/2021 | Nakagawa et al. | |
| 2021/0336274 | A1 | 10/2021 | Jung et al. | |
| 2021/0351400 | A1 | 11/2021 | Newbound et al. | |
| 2021/0351409 | A1 | 11/2021 | Lu et al. | |
| 2021/0359292 | A1 | 11/2021 | Lu et al. | |
| 2021/0367229 | A1 | 11/2021 | Lu et al. | |
| 2021/0384497 | A1 | 12/2021 | Nakano et al. | |
| 2022/0069281 | A1 | 3/2022 | Mishra et al. | |
| 2022/0109142 | A1 | 4/2022 | He et al. | |
| 2022/0109180 | A1 | 4/2022 | Li et al. | |
| 2022/0115639 | A1 | 4/2022 | He et al. | |
| 2022/0115646 | A1 | 4/2022 | Colwell et al. | |
| 2022/0115739 | A1 | 4/2022 | Xu et al. | |
| 2022/0173385 | A1 | 6/2022 | Jang | |
| 2022/0181637 | A1 | 6/2022 | Jang | |
| 2022/0190346 | A1 | 6/2022 | Jang | |
| 2022/0199977 | A1 | 6/2022 | He et al. | |
| 2022/0246915 | A1 | 8/2022 | Jang | |
| 2022/0246936 | A1 | 8/2022 | Jang | |
| 2022/0246937 | A1 | 8/2022 | Jang | |
| 2022/0255080 | A1 | 8/2022 | Jang | |
| 2022/0359857 | A1 | 11/2022 | Jang | |
| 2023/0085771 | A1 | 3/2023 | Lee et al. | |
| 2023/0137721 | A1 | 5/2023 | Chang et al. | |
| 2023/0163271 | A1 | 5/2023 | Zhang et al. | |
| 2023/0170482 | A1 | 6/2023 | Zhang et al. | |
| 2023/0369573 | A1 | 11/2023 | Newbound et al. | |

FOREIGN PATENT DOCUMENTS

| | | | |
|---|---|---|---|
| CN | 103311523 | B | 2/2017 |
| CN | 110212171 | A | 9/2019 |
| CN | 110350130 | A | 10/2019 |
| CN | 111129429 | A | 5/2020 |
| CN | 106047015 | B | 4/2021 |
| CN | 109560267 | B | 7/2021 |
| CN | 110112407 | B | 4/2022 |
| CN | 113745490 | B | 11/2022 |
| CN | 115449056 | A | 12/2022 |
| CN | 116111095 | A | 5/2023 |
| CN | 116314819 | A | 6/2023 |
| DE | 102009033251 | A1 | 9/2010 |
| JP | 6569230 | B2 | 9/2019 |
| JP | 2020013637 | A | 1/2020 |
| JP | 6734114 | B2 | 8/2020 |
| JP | 2021015769 | A | 2/2021 |
| JP | 6941535 | B2 | 9/2021 |
| JP | 7033436 | B2 | 3/2022 |
| JP | 7040364 | B2 | 3/2022 |
| JP | 2022037960 | A | 3/2022 |
| JP | 7067277 | B2 | 5/2022 |
| JP | 7070201 | B2 | 5/2022 |
| JP | 7070242 | B2 | 5/2022 |
| JP | 7097283 | B2 | 7/2022 |
| JP | 7105166 | B2 | 7/2022 |
| JP | 7107088 | B2 | 7/2022 |
| JP | 7153463 | B2 | 10/2022 |
| JP | 7190314 | B2 | 12/2022 |
| JP | 2023015587 | A | 2/2023 |
| KR | 101348200 | B1 | 1/2014 |
| WO | 2015015894 | A1 | 2/2015 |
| WO | 2015053199 | A1 | 4/2015 |
| WO | 2019188430 | A1 | 10/2019 |
| WO | 2019204135 | A1 | 10/2019 |
| WO | 2019241065 | A1 | 12/2019 |
| WO | 2019241372 | A1 | 12/2019 |
| WO | 2019246474 | A1 | 12/2019 |

(56) References Cited

FOREIGN PATENT DOCUMENTS

| | | | |
|---|---|---|---|
| WO | 2020021683 | A1 | 1/2020 |
| WO | 2020041559 | A1 | 2/2020 |
| WO | 2020046444 | A1 | 3/2020 |
| WO | 2020055470 | A1 | 3/2020 |
| WO | 2022244272 | A1 | 11/2022 |

OTHER PUBLICATIONS

Cetiner et al "Polypyrrole/Polyacrylonitrile Composite Films: Dielectric, Spectrophotometric and Morphologic Characterization", Fibers and Polymers 2010, vol. 11, No. 6, 843-850.*

U.S. Appl. No. 18/744,310, filed Jun. 14, 2024, by Newbound et al. (not submitted herewith pursuant to the waiver of 37 C.F. R. § 1.98(a)(2)(iii) issued by the Office on Oct. 19, 2004).

U.S. Appl. No. 17/700,111, filed Mar. 21, 2022, by Newbound et al. (not submitted herewith pursuant to the waiver of 37 C.F. R. § 1.98(a)(2)(iii) issued by the Office on Oct. 19, 2004).

Liu et al., Oxidative Template for Conducting Polymer Nanoclips; (b) J. Am. Chem. Soc. 2010, 132, 38, 13158-13159.

* cited by examiner

| Record Number | Sample Name | Dx (10) (μm) | Dx (50) (μm) | Dx (90) (μm) |
|---|---|---|---|---|
| 30 | Powder #10 0bar | 5.25 | 12.9 | 32.0 |
| 31 | Powder #10 1bar | 3.63 | 10.6 | 26.3 |
| 32 | Powder #10 2bar | 2.98 | 9.57 | 25.4 |

Scheme 2.

SECONDARY PARTICLE COMPOSITE GROUP IVA MATERIALS

CROSS-REFERENCE TO RELATED APPLICATIONS

The present application is related to and claims the priority benefit of U.S. Provisional Patent Application No. 63/373,656, filed Aug. 26, 2022, and U.S. Provisional Patent Application No. 63/452,993, filed Mar. 17, 2023, the entire contents both of which are incorporated herein by reference.

FIELD

The present disclosure relates to particulate compositions and their use in, e.g., battery applications.

INTRODUCTION

High-capacity negative electrodes used in lithium-ion batteries include active materials that form alloys with lithium in contrast to conventional graphite active materials that accommodate lithium by intercalation. Intercalation is a process by which a mobile ion or molecule is reversibly incorporated into vacant sites in a crystal lattice. The crystal lattice structure of the active intercalation material has a fixed volume and limits active sites that accommodate the mobile ions. Fully charged with lithium, graphite has a theoretical gravimetric capacity of 372 mAh/g, while an alloying active material such as silicon can have an order of magnitude higher theoretical capacity (4,200 mAh/g for silicon).

Widespread use of alloying active materials such as silicon has been limited in commercial lithium-ion batteries (LIBs) because of inherent properties that silicon and other lithium-active metal alloys possess that lead to rapid fade in reversible capacity upon undergoing multiple charge/discharge cycles. A significant problem is the volume expansion between the charged and discharged states. Swelling of silicon particles by as much as 400% from fully discharged to fully charged states can cause mechanical degradation of the SEI (solid electrolyte interphase) barrier formed at the interface where electrochemical reduction of lithium ions takes place as they migrate towards and into the active materials. Disruption of SEI causes cracking and subsequent reforming more SEI until excessive SEI impedes ion conduction through the barrier. Mechanical stress can also cause silicon particles to become pulverized, unearthing more surface area around which SEI must be formed. Furthermore, SEI formation consumes active lithium in the cell and leads to loss of electrical contacts.

Because electrical conductivity is a fundamental property that the electrodes in and electrochemical cell must possess, materials that allow electron mobility are required. Inorganic carbon such as carbon black or carbon nanotubes are often used to enhance electrical conductivity. However, electrically conductive polymers can also serve as conductive agents while also providing desirable mechanical properties to the matrix surrounding the lithium-active materials.

The most widely used method of preparing intrinsically conductive polymers, such as polypyrrole (PPy), polyfluorene (PF), or polyaniline (PANI), is chemical oxidative polymerization. This process is carried out in an acidic aqueous medium in the presence of an oxidating agent, such as ammonium persulfate (APS) or ferric chloride ($FeCl_3$), with the intermediate formation of a complex of a monomer molecule with a dopant. The bulk electrical conductivity and mechanical properties of these polymers vary depending on their monomeric nature and the way of doping.

In addition, the properties largely depend on the sub-micro-level and nano-level morphology of a polymer. The micro-level morphology is the geometry and parameters of an arrangement of the individual polymer fibers, such as fiber length and packing density. The nano-level morphology normally means the way the individual polymer chains are packed within the fiber's volume. An individual fiber consists of a highly conductive crystal core and a weakly conductive amorphous periphery. These structures are determined by numerous synthetic conditions such as the choice of a dopant, the viscosity and acidity of the reaction mixture, the medium of the emulsion, the choice and amount of oxidating agent, the temperature and duration of the reaction (these two factors are related), and the intensity of agitation.

The doping fraction is needed not only to make the polymer chains conductive; it also enables adjustment of the polymer's mechanical properties, solvent dispersibility, and chemical resistance. Additionally, the dopant chemical structure can be designed in such a way as to ensure chemical or thermodynamic interaction with the surrounding materials, such as other matrix polymers, outer shell materials, and polymer electrolytes.

Another important aspect of conductivity for metal ion battery electrodes is ion conductivity. Polyacrylonitrile is a very good ion conductor, but it is not intrinsically electrically conductive. The PAN polymer does not require a dopant. The helical conformation of PAN chains ensures the lowest energy of the cyano group units due to their weak repulsion, which makes the chains electrically insulative.

SUMMARY

Disclosed herein is an approach to surround Group IVA-based particles with a polymeric-based composite material that possesses both ion and electronic conductive properties. The composite material has very good mechanical properties with high elastic modulus that can dissipate mechanical stress evenly into the surrounding volume. This can allow the mitigation of crack formation, as well as mitigate and/or terminate crack propagation, which can impede penetration into the volume by the electrolyte solvent. Accordingly, the disclosed approach can preclude contact of potential cracks with the Group IVA-based particle.

In one aspect, a secondary particle is disclosed. The exemplary secondary particle may comprise a porous polymer matrix comprising a polyacrylonitrile (PAN)-polypyrrole (PPy) composite, where nitrile groups of PAN are hydrogen bonded to PPy as represented by formula (I) or formula (II), where n is a number of repeating units of PPy and m is a number of repeating units of PAN:

(I)

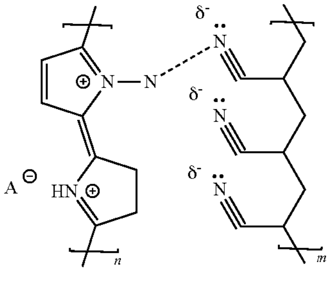

-continued (II)

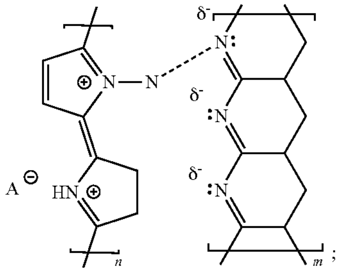

; and at least 1 wt % and no greater than 88 wt % of submicron-sized primary particles dispersed in the porous polymer matrix, the plurality of submicron-sized primary particles comprising at least one of: carbon (C), silicon (Si), germanium (Ge), tin (Sn), or an alloy of a Group IVA element; and the secondary particle having a Dv50 diameter no less than 3 μm and no greater than 12 μm.

In another aspect, a method of making a secondary particle is disclosed. The exemplary method may include combining pyrrole in acidic media with an ammonium bromide-containing material and with polyacrylonitrile (PAN) to yield a reactant mixture; agitating the reactant mixture to generate a homogenous emulsion; adding a reaction initiator to the homogenous emulsion to generate a reaction mixture, the reaction initiator comprising either ammonium persulfate (APS) or anhydrous ferric chloride; agitating the reaction mixture for at least 24 hours to generate a product mixture; centrifuging the product mixture to yield purified polymer matrix particles; combining the purified polymer matrix particles with a slurry comprising surface-modified primary particles comprising elemental Group IVA material having a Dv50 size less than 500 nm; and evaporating the solvent from the slurry to form micron-sized secondary particles comprising a plurality of the primary particles dispersed in a porous polymer matrix.

In another aspect, a method of making a secondary particle is disclosed. The exemplary method may include combining polymers in a non-polar solvent, the polymers comprising polyacrylonitrile (PAN) and doped polypyrrole (PPy), wherein a weight ratio of PAN to doped PPy is between 80:20 and 95:5; comminuting the combined solvent and polymers in a circulating bead mill at a rotor tip speed no less than 11 m/s and no greater than 14 m/s and for a time period no less than 200 minutes; and after comminuting, adding elemental Group IVA material having a Dv50 size less than 500 nm; and evaporating the non-polar solvent, thereby generating the secondary particles.

In another aspect, highly conductive composites are disclosed from two methods of preparation. One method of making of these composites can be accomplished with mechanochemical processing of PAN and PPy polymers together. Another method of pyrrole polymerization in the presence of PAN also yields a copolymer or polymer composite. Both of these methods yield products that exhibit synergistic effects on electrical conductivity and mechanical properties beyond that of the pure polymers together.

There is no specific requirement that a material, technique or method relating to Group IVA secondary composites materials include all of the details characterized herein, in order to obtain some benefit according to the present disclosure. Thus, the specific examples characterized herein are meant to be exemplary applications of the techniques described, and alternatives are possible.

DETAILED DESCRIPTION

Figure 1:
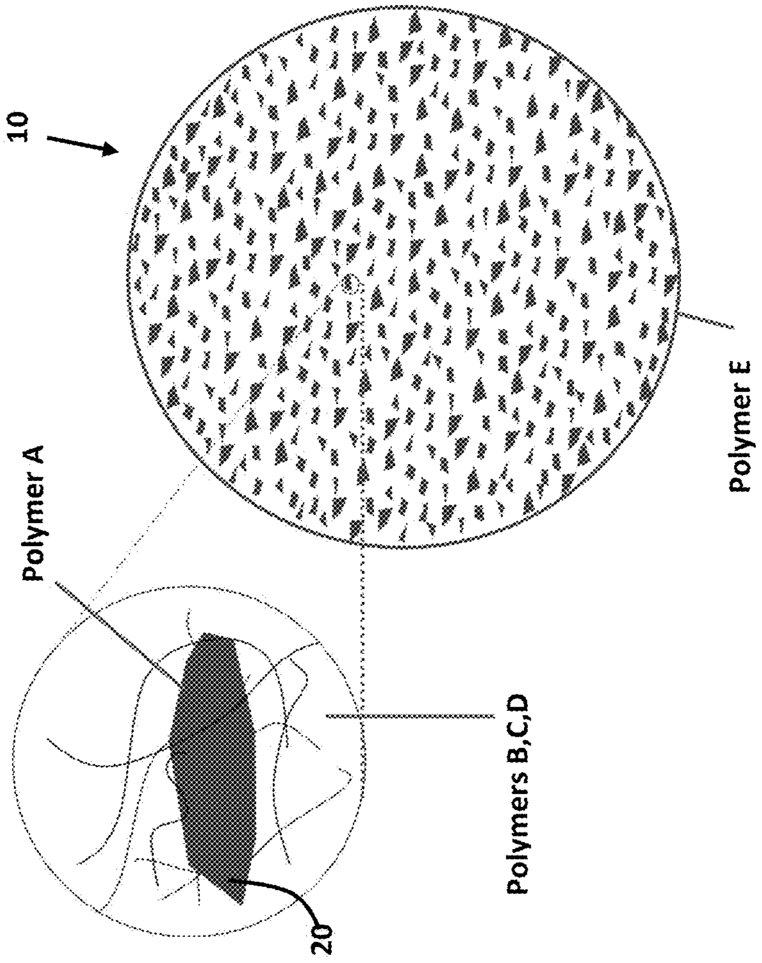
FIG. 1 shows a schematic of an example secondary particle and an exploded schematic view of its polymer matrix.

Systems, methods and techniques disclosed herein relate to micron-sized secondary particles. Exemplary secondary particles include an ionically and electrically conductive polymer matrix comprising submicron primary particles. In some instances, the submicron primary particles may be surface modified.

Exemplary secondary particles may be capable of loading more primary particles per secondary particles than previously existing technology. For instance, exemplary secondary particles may include more than 20 percent by weight, such as up to 88 percent by weight, of primary particles. Accordingly, exemplary secondary particles are capable of providing greater energy density by volume than existing technology. Exemplary secondary particles may be tailored to include different amounts of primary particles depending upon a particular end use.

I. DEFINITIONS

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. All publications, patent applications, patents, and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example, "about 1" may also mean from 0.5 to 1.4.

As used herein, the term "ambient pressure" refers to the pressure of the external environment at the location at which the system and/or the process of the present disclosure is operated. The ambient pressure is typically atmospheric pressure.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein.

For the recitation of numeric ranges herein, each intervening number therebetween with the same degree of precision is explicitly contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are explicitly contemplated. For example, when a pressure range is described as being between ambient pressure and another pressure, a pressure that is ambient pressure is expressly contemplated.

II. EXEMPLARY SECONDARY PARTICLES

Various aspects of exemplary secondary particles are described below.

A. Structure of Exemplary Secondary Particles

The secondary particle can include a polymer matrix and primary particles. The primary particles can be embedded in the polymer matrix. In some embodiments, the primary particles are embedded and well-dispersed in the polymer matrix. The polymer matrix space between primary particles can also be referred to as a volume or matrix volume.

The secondary particle can further include bridging segments, a coating, and surface modifiers. Unlike a matrix composed entirely of carbon, the properties of the polymer matrix (of the secondary particle) can be tailored to improve mechanical properties while also possessing advantageous electrical and ion conductivity. For example, the secondary particle can be tailored to have overall elastic properties, such as the matrix volume having elastic properties. The elastic properties along with porosity in the matrix volume of the secondary particle can allow for the volume expansion of primary particles, such as Li-active materials, by mitigating or impeding crack formation and propagation in the secondary particle. An optional outer shell on the secondary particle can provide a barrier that can allow an SEI to form while inhibiting electrolyte solvents from permeating into areas surrounding the primary particles.

The architecture of the secondary particle can provide the benefits of encapsulation of the primary particles—regardless of how the primary particles were prepared. Said another way, the secondary particle can provide properties that are agnostic toward the composition, morphology, or surface modification of the primary particles within its volume. In some instances, primary particles can be prepared with a carbon coating or an oxide coating and can be incorporated into the secondary particle just as other surface-modified primary particles can be incorporated into a secondary particle matrix.

A schematic illustration of exemplary secondary particle 10 is shown in FIG. 1. As shown, secondary particle 10 comprises a plurality of primary particles 20. Various polymers are shown and, as discussed below, various embodiments may include at least one or more polymers.

Polymer A is a polymer that surface modifies primary particle 20. Polymer B is an electron-conducting polymer. As shown, Polymer B resides in a volume of the secondary particle 10 and/or on a surface of the secondary particle 10. Polymer C is an ion-conducting polymer that resides in the volume of the secondary particle 10 and/or on the surface of the secondary particle. Polymer D is an elastic polymer that resides in the volume of the secondary particle 10. Polymer E is a polymer covering a portion or all of the surface of secondary particle 10. As discussed below, Polymer E may be an in-situ polymer applied by a vapor deposition technique, such as low-temperature chemical vapor deposition.

Polymers A, B, C, D and E are not necessarily mutually exclusive and may represent one or more classifications of polymers. For example, one polymer may represent both an electron conducting and an ion-conducting polymer. One polymer may be disposed as a coating on or be grafted to another polymer. One or more polymers may serve as components in the volume of the secondary particle as well as being applied in-situ as the outer shell of the secondary particle.

The primary particle may have a polymer applied as a surface modifier. The purpose of the surface modifier may be to passivate the primary particle as a barrier to oxidation and to provide a surface that interacts favorably to the surrounding matrix.

The matrix in the volume of the secondary particle may be comprised of polymers that are electron-conducting. While electron-conducting polymers may be effective as only a minor fraction of the overall bulk components in the matrix, they may be arranged such that a continuous conductive path throughout the matrix is provided.

The largest fraction of the polymer matrix may be comprised of the ion-conducting polymer. The ion-conducting polymer has porosity and will accommodate the passage of Li+ ions throughout the matrix. The ion-conducting polymer also serves as a buffer to help accommodate volumetric expansion of the primary particles as they undergo lithiation and delithiation.

A composite of an ion-conducting polymer with an electrically-conductive polymer may have enhanced properties derived from the interaction of these polymers with each other.

An elastic polymer may serve as a binder that provides a measure of durability to the secondary particle. Mechanical stability may assist with post-processing to keep the matrix together when, for example, evaporating solvents, during heat processing, chemical vapor deposition (CVD) coating and subsequent mixing of the secondary particles in electrode slurries.

An outer coating on the secondary particle may be applied by (CVD) processes. A polymer film can be applied by a low-temperature CVD in situ polymerization. This is accomplished by introducing the monomer in the vapor phase with an initiator applied on the surface or within the volume of the secondary particles then heating to a temperature that causes the polymer initiator to become active. The dopant, if used for making the outer polymer coating electrically conductive, may be applied as a final step in the process or as part of the CVD process.

B. Exemplary Chemical Constituents

Various aspects of exemplary chemical constituents of the secondary particle are described below.

1. Exemplary Porous Polymer Matrices

Exemplary porous polymer matrices may comprise at least one of: one or more electron-conducting polymers, one or more ion-conducting polymers, one or more elastic polymers, or combinations thereof.

Polymers can be chosen for enhancing ion conductivity of the composites. Example polymers having ion conductivity, include but are not limited to, polyethylene oxide (PEO), polyglycol ethers (PEG), polypyrrole (PPy), polyimides (PI), polyamide imide (PAI), polyacrylic acid (PAA), polyacrylonitrile (PAN), polyaniline (PANI) and various copolymer arrangements of these. Some polymers may gain desirable properties by additional processing.

In some embodiments, the polymer matrix includes PAN. PAN can gain mechanical stability by being heated to about 275-300° C., which can allow the formation of six-member rings from the cyclization of nitrile functional groups on the polymer chain, as schematically shown below.

Scheme 1

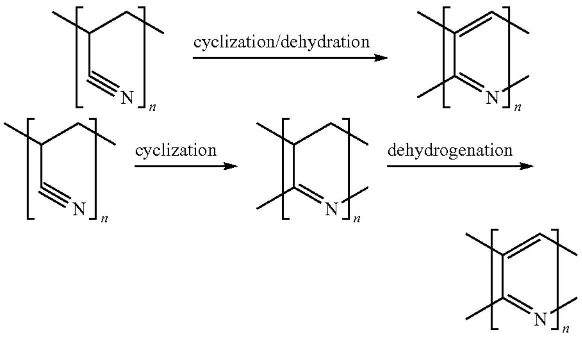

As shown in Scheme 1, at temperatures above 250° C., the PAN chains undergo cyclization and dehydrogenation, which collectively limit conformations and improve the transmission of charges along to the chains. Additionally, cyclization increases the rigidity of PAN, thereby improving the matrix's capacity to withstand numerous charge-discharge cycles.

With further heating of the PAN polymer beyond 350° C., gradual dehydrogenation of the PAN chain occurs. With further heating of the PAN polymer at temperatures of 600° C. and higher, substantial carbonization occurs forming a highly conductive nitrogen-enriched (or nitrogen-doped) graphene-like network. Likewise, heat processing of PAN/PPy or PPy polymer domains may also lead to highly conductive partially dehydrogenated matrices.

In addition to an ion-conducting polymer, a second polymer and/or inorganic carbon material can be included that is electron-conducting. Examples of inorganic materials include, but are not limited to, carbon black, graphene, carbon nanotubes, fullerenes or other highly conductive carbon-based materials. Alternatively, electron-conducting polymers may impart electrical conductivity while also being capable of modifying their structures and chemical composition to provide desired physical properties. Examples of polymers having electrical conductivity include, but are not limited to, polypyrrole, polythiophene, polyaniline, and polyfluorene derivatives.

In some embodiments, the electron-conducting polymer includes a polymer having at least one of the recurring units as listed below:

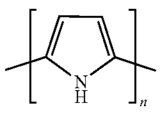
Polypyrrole (PPy)

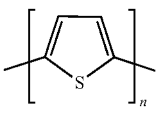
Polythiophene (PTh)

-continued

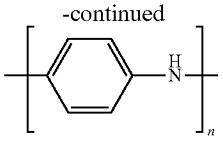

Polyaniline (PANi)

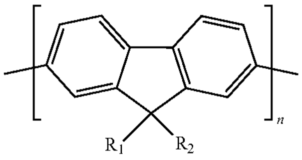

Polyfluorene (PF)

In some embodiments, the polymer matrix includes PAN and PPy. In some embodiments, the polymer matrix includes PAN and doped PPy.

Polymers that lack sufficient electron conductivity can be modified by inserting ionically bonded dopants on the polymer chains, which can impart electron conductivity. In these embodiments, doped polymers may have both high electrical conductivity as well as high ion conductivity.

A doped polymer may include more than one dopant. Suitable dopants may be any chemical that possesses a highly ionizing functional group, such as an alkyl- or aryl-sulfonate or a halide. Exemplary halides include fluoride ($F^-$), chloride ($Cl^-$), and bromide ($Br^-$) ions. An exemplary aryl sulfonate is dodecylbenzene sulfonic acid (DBSA).

In some instances, PAN may enhance conductivity of PPy by acting as an additional dopant. In some embodiments, a polymer can include a dopant selected from the group consisting of an alkyl-sulfonate, an aryl-sulfonate, and a halogen.

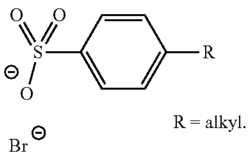

R = alkyl.

PPy and PAN particles may be added as a component individually or as a PAN-PPy composite. In some instances, PPy may be polymerized in the presence of PAN particles with the surface of the PAN particles serving as a template on which PPy polymerization takes place. A resulting material is termed a "PAN-PPy composite." In these implementations, the resulting electrical conductivity of the PAN-PPy composite may be much higher than the conductivity of the pure polymers blended together in the same proportions.

PAN-PPy composites with enhanced electrical and mechanical properties may also be prepared by mechanochemical processing of the individual polymers together. The PAN-PPy composites prepared by mechanochemical processing may become oxidized unless the process is conducted with the exclusion of air under nitrogen or noble gas environment. In these implementations, the PAN-PPy composites exhibit highly electrically conductive enhancement compared to a mixture of the pure polymers.

Figure 5A:
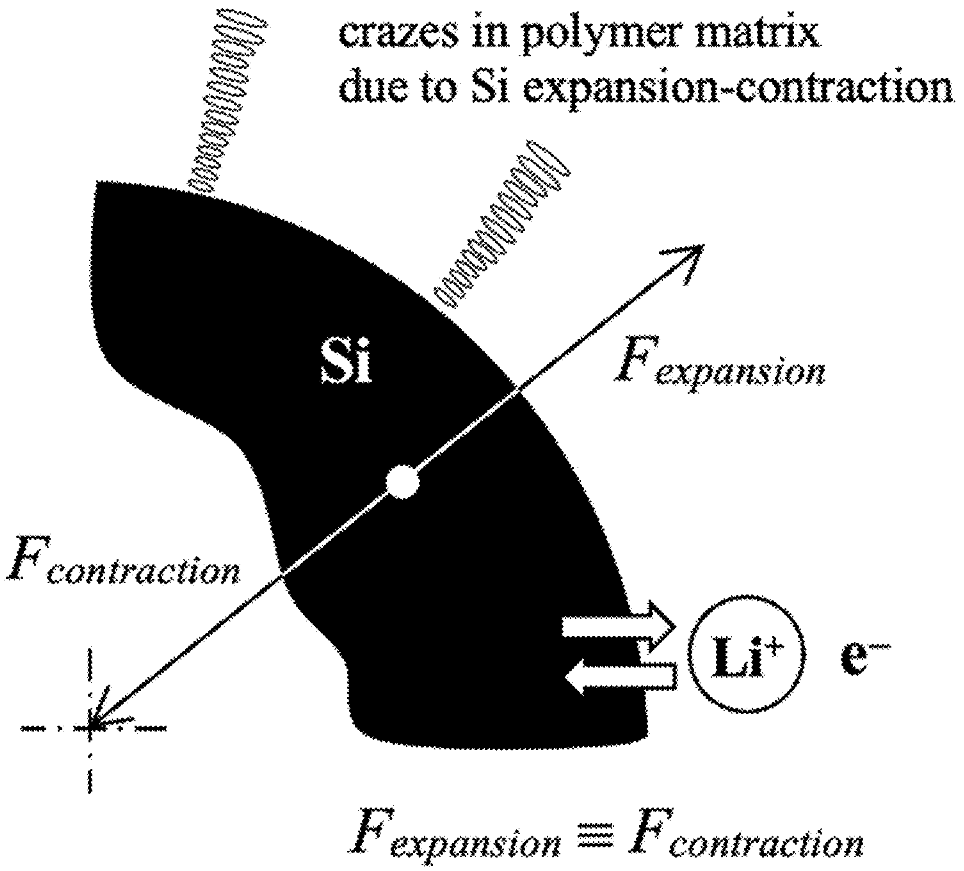
FIG. 5A shows a schematic illustration of the secondary particle matrix in the vicinity of a primary particle (e.g., silicon particle) in low and high states of charge (SOC) with elastic components in the polymer matrix that can dissipate mechanical energy to prevent the propagation of cracks.

Another useful property of the secondary particles for maintaining electrode integrity is elasticity. Secondary particle morphology may be designed to incorporate inclusion domains with viscoelastic properties within the matrix volume that can further mitigate the effects of expansion/contraction of Li-active elements. Due to its elastic nature and uniform distribution, the inclusion domains can dissipate mechanical energy into the surrounding volume. This can relieve stress by deflection and branching, as shown in FIG. 5A. In this design, the electrolyte does not enter the fractures around silicon and remains in contact with undamaged outer surfaces of the secondary particle. The SEI formed on a stable surface of the secondary particle can remain relatively static during the lithiation/delithiation cycles.

The polymer matrix can also include a highly elastic polymer. In some embodiments, the elastic polymer includes a polyolefin elastomer (POE). The polymer matrix can include an olefinic polymer elastomer with a density in the range of 0.86-0.91 g/cc that can have a morphology of bundled crystals without well-developed spherulites. The ordered structure of alternating linear and branched segments in the polymer chains differentiate POEs from conventional low-density olefins such as LDPE and LLDPE. The linear segments can crystallize, forming nodes in the volume with the branched segments remaining amorphous. As a result, each POE product can exhibit a unique combination of hard and soft domains which can enable control of its deformation behavior with accuracy. In some embodiments, the elastic polymer can be sulfonated or carboxylated and includes at least one of the recurring units listed below.

ethylene (linear) segment octene (branched) segment

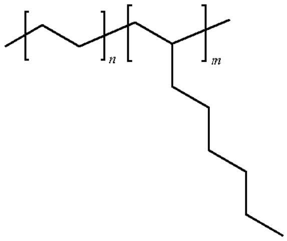

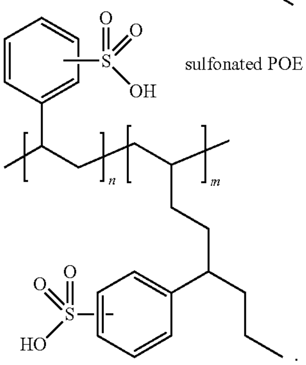

sulfonated POE ethylene (linear) segment octene (branched) segment

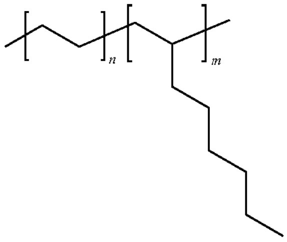

-continued

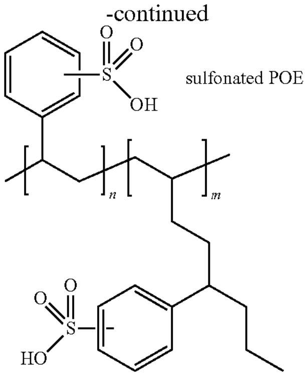

sulfonated POE carboxylated POE

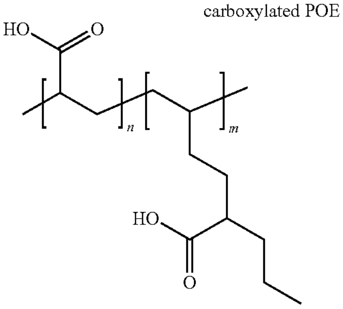

Both sulfonic and carboxyl groups contribute to the increased compatibility of POE to the PAN matrix. In the volume of secondary particles, carboxyl groups may be removed during the heating of the material (decarboxylation). Sulfonic groups remain in the volume of secondary particles, enhancing ion conductivity and additionally doping polypyrrole that is also present in the matrix volume.

The elastic polymer can include a copolymer of poly (acrylonitrile-co-butadiene). In some embodiments, an elastic copolymer of poly(acrylonitrile-co-butadiene) is included in the secondary particle with PPy and the primary particle. This copolymer can be used to replace a portion of PAN in the secondary particle to improve elasticity of the secondary particle.

In embodiments where butadiene-acrylonitrile copolymer is included, the copolymer may comprise various butadiene/acrylonitrile ratios. For instance, and without limitation, exemplary copolymers may have 70 wt % butadiene and 30 wt % PAN weight percent (wt %). The generic commercial name of this type of material is Nitrile Butadiene Rubber (NBR). Its alternating rigid acrylonitrile segments and elastic butadiene segments can form supramolecular domain-like structures. The sequential length of butadiene segments can determine the size of the rubber-like flexible domains. Since both types of the segments are covalently linked, they cannot be separated into two independent fractions during solvent phase migration, as can happen with unmodified POE. In some embodiments, an alkyl tail, a thiol, a carboxyl group or a combination thereof is grafted onto the NBR copolymer. In some embodiments, poly(acrylonitrile-co-butadiene) is used on its own without PAN being present.

In some embodiments, the ion-conducting polymer includes polyacrylonitrile (PAN), polyacrylic acid (PAA), poly(acrylonitrile-co-butadiene) (NBR), polyethylene oxide (PEO), polyglycol ethers (PEG), or a modified polyolefin elastomer (M-POE). In some instances, NBR can be carboxyl terminated (CAS-No. 68891-46-3).

In some embodiments, the electron-conducting polymer includes polyimide (PI), polyamide-imide (PAI), polypyrrole (PPy), or polyaniline (PANI). In some embodiments, the electron-conducting polymer is modified with an ionic dopant. In some embodiments, the ionic dopant includes an alkyl sulfonate, a halide, or both. In some embodiments, the electron-conducting polymer is disposed on the surfaces of the ion-conducting polymer.

In some embodiments, the elastic polymer includes polyolefin elastomer (POE) or poly(acrylonitrile-co-butadiene) (NBR).

In some embodiments, the polymer matrix includes an ion-conducting polymer selected from the group consisting of polyacrylonitrile (PAN), poly(acrylonitrile-co-butadiene) (NBR), polyethylene oxide (PEO), polyglycol ethers (PEG), and modified polyolefin elastomer (M-POE); an electron-conducting polymer selected from the group consisting of polyimide (PI), polyamide-imide (PAI), polypyrrole (PPy), polyfluorene derivatives or polyaniline (PANi); and an elastic polymer selected from the group consisting of polyolefin elastomers (POE) or poly(acrylonitrile-co-butadiene) (NBR).

In some embodiments, exemplary porous polymer matrices comprise a polyacrylonitrile (PAN)-polypyrrole (PPy) composite. In these instances, nitrile groups of PAN are hydrogen bonded to PPy as represented by formula (I) or formula (II), below, where n is a number of repeating units of PPy and m is a number of repeating units of PAN:

(I)

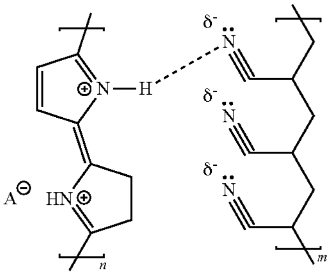

(II)

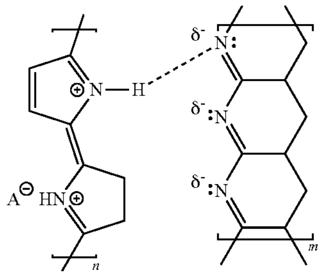

In some implementations, a PAN backbone of the polymer matrix comprises six-member rings, as shown in formula (II) above.

Various amounts of PPy may be bonded to PAN. For instance, at least 50 wt. %; at least 60 wt. %; at least 70 wt. %; or at least 80 wt. % of the PPy may be bonded to the PAN. In various implementations, between 50 wt. % and 80 wt. %; between 60 wt. % and 80 wt. %; between 70 wt. % and 80 wt. %; between 50 wt. % and 70 wt. %; or between 55 wt. % and 75 wt. % of the PPy may be bonded to the PAN.

2. Exemplary Primary Particles

As discussed elsewhere, the primary particle can include a Li-active alloy that is suitable for battery applications. For example, the primary particle can include Si, Ge, Sn, or an alloy of a Group IVA element, or any combination thereof. In some embodiments, the primary particle includes Si, Ge, Sn, or an alloy of a Group IVA element. In some embodiments, the primary particle includes Si, Ge, or Sn. In some embodiments, the primary particle includes Si.

The primary particle can be tailored both in size distribution and surface characteristics. Surface modification can improve the performance properties of the primary particle, as well as can improve performance properties of the overall secondary particle. The primary particle can be made in a number of different ways. In some embodiments, the primary particle is made via comminution methods using inert (e.g., non-competing) solvents. Surface modifiers can be applied to the primary particle during the comminution process. The inert environment can be maintained during the comminution process while selected surface modifiers are applied. Limiting oxide formation during comminution of elemental silicon can allow application of non-oxide surface modifiers that can be passivating and yet, more highly electrically conductive as compared to $SiO_x$ surfaces.

Further discussion of primary particles produced from comminution can be found in US 2015/0243973 A1 and US 2020/0044240 A1, both of which are incorporated by reference herein in their entirety. However, any submicron Li-active alloys are envisioned within the scope of this disclosure as the primary particle.

In some embodiments, the primary particle comprised of silicon may be made from silanes or silane halide analogs. These can include but are not limited to dichlorosilane, hexachlorodisilane, monochlorosilane, disilane, polysilanes, silicon tetrachloride, tetrachlorosilane, etc. In some embodiments, silanes may be infused into a conductive carbon matrix from which primary particles can be formed.

In some embodiments, the primary particle has a passivating surface modifying layer that may be a carbon precursor, which can be dehydrogenated upon heat processing. Additional carbon coatings can be applied by contacting the primary particle with a carbon precursor that can be delivered in the vapor phase while heating in a vacuum or anaerobic atmosphere. Ideally, the carbon precursor is a non-oxide-bearing hydrocarbon. An anaerobic atmosphere can be nitrogen gas ($N_2$) or a noble gas. The use of forming gas as a reducing atmosphere is also within the scope of this embodiment.

In some embodiments, the primary particle is fluidized in a solvent such as cyclohexane or normal alkanes (C6-C8) and combined with a carbon precursor. The carbon precursor may be dissolved in the solvent or dispersed in the solvent as a separated phase. Upon evaporation of the solvent, the remaining solids can be heat processed to cure the carbon precursor). Additional polymers, copolymers or cross-linking agents may be subsequently combined with a cured Si/carbon precursor to form the secondary particles. Optionally, an additional layer of amorphous carbon may be applied from vapor phase carbon precursors.

3. Exemplary Polymerizations

Figure 11:
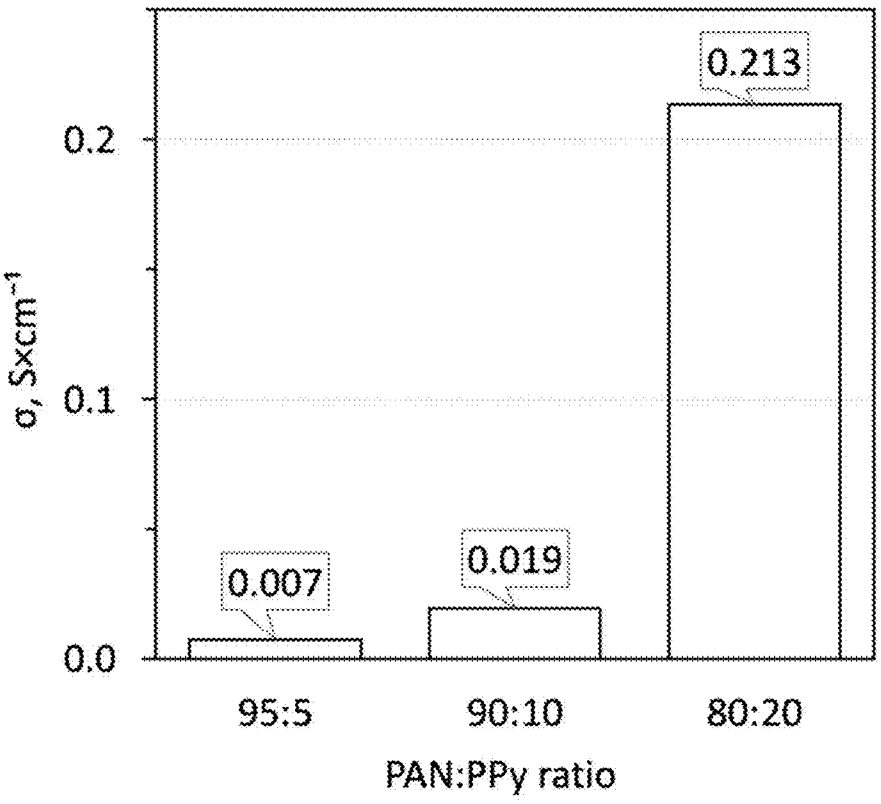
FIG. 11 shows conductivity data for exemplary PAN-PPy composite materials at different weight ratios.

In some embodiments, reagents may be polymerized in the presence of template materials on which the newly formed polymer will envelop. An example of this is the polymerization of pyrrole in the presence of PAN particles. It has been found that when PPy is formed in a stirred aqueous slurry with PAN:PPy weight ratios of 95:5, 90:10 and 80:20, the resulting powders have much higher conductivities (as shown in FIG. 11) than mixtures of the pure polymers of the same weight ratios.

Figure 12:
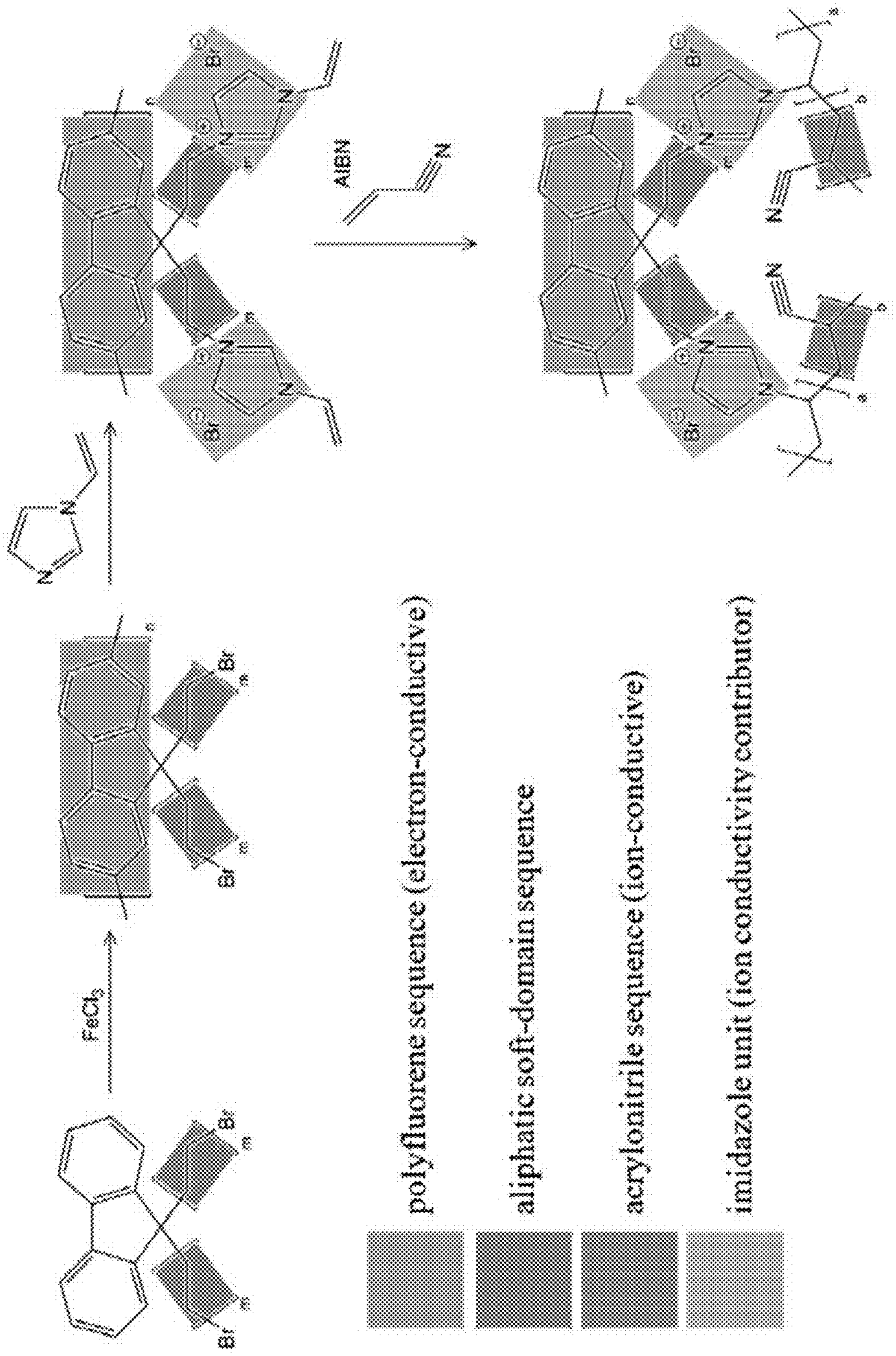
FIG. 12 shows an exemplary scheme for polyfluorene synthesis and functionalization.

Polyfluorene (PF) may be synthesized by oxidative emulsion polymerization. While electrical conductivity is typically weaker than doped PPy, this polymer has several reasons for possible inclusion. Polyfluorenes do not require a dopant to facilitate conductivity; electrons are conducted through the polymer's aromatic structure. PF can be well-dispersible in non-polar solvents. PF can be chemically functionalized over a reasonably wide range without compromising its conductivity, making it potentially suitable for covalent bonding with surrounding materials (Scheme 2, FIG. 12). PF can be used as a replacement for the other conducting polymers, as well as in combination with them.

4. Exemplary Bridging Segments

Exemplary secondary particles may comprise bridging segments dispersed within exemplary porous polymer matrices. Generally, "bridging segments" are chemical moieties that are capable of bridging or cross-linking to other components in the composite. Typically, the bridging or cross-linking occurs after one or more heating operations, discussed in greater detail below.

In some instances, exemplary bridging segments may be referred to as dopants. As mentioned above, dopants may be chosen to further impart desired surface energies to the polymer(s) and the secondary particles in which they are dispersed. Dopants may also be modified with functional groups that are capable of bridging or cross-linking to other components in the composite.

By following synthetic methods known in the arts of organic and polymer chemistry, materials can be incorporated in the secondary particle with different properties. Accordingly, the chemical constituents of the secondary particle can be well dispersed and chemically bonded, which can improve the overall mechanical properties of the secondary particle. In some embodiments, the dopant has a crosslinking moiety. In some embodiments, the crosslinking moiety is derived from dienes, dinitrile, and/or diazo compounds. For example, crosslinking moieties may include butadiene, 1,5-hexadiene, 1,9-decadiene, malononitrile, sebacic acid dinitrile, 1,4-phenyldiazomethane In designing secondary particles including polymers, mechanical stability can be useful, particularly in environments where volume expansion and/or contraction of the secondary particle can take place. When employed in solvent-based electrolyte batteries, the secondary particle can resist and/or limit swelling from electrolyte solvents. In such environments, the establishment of covalent and ionic bonding between the polymers and other components of the secondary material can improve overall stability. This can be accomplished by using polymer and/or copolymers which can be cross-linked with each other and to other materials in the secondary particle. In some embodiments, the polymer matrix includes doped polymers that can crosslink with each other (e.g., polymer with polymer), crosslink with the primary particle, and/or crosslink with other components of the polymer matrix. In some embodiments, the polymer matrix includes a doped ion-conducting polymer and a doped electron-conducting polymer where the ion-conducting polymer can form crosslinks with the electron-conducting polymer and vice versa.

Exemplary bridging segments may include doped PPy. In some embodiments, doped PPy may possess functional groups on the dopant that can cross-link to PAN when heating induces cyclization of the nitrile groups or insertion of the functional groups into the PAN polymer chain. This can add additional structural stability to the secondary particles and can help to prevent partitioning of the polymer components as solvent is evaporated.

Exemplary bridging segments may be made by the following reaction

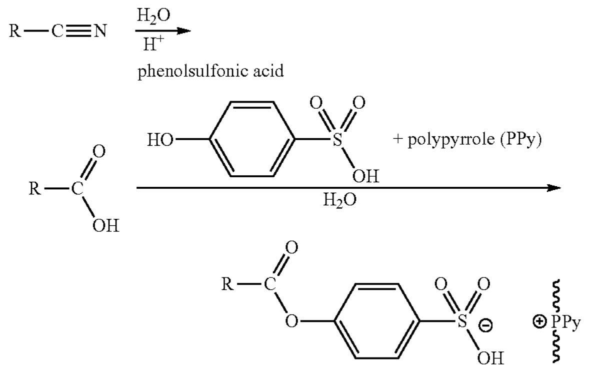

As shown, esterification of phenolsulfonic acid may bridge the PAN and PPy polymers, which may improve various properties of exemplary secondary particles.

5. Exemplary Outer Layers

Exemplary secondary particles may have an outer shell. In various implementations, exemplary secondary particles may have no outer shell. In various implementations, exemplary secondary particles may have a shell on a portion of the secondary particle. In various implementations, exemplary secondary particles may have a shell surrounding the secondary particle. In various implementations, exemplary secondary particles may have a shell mixed or interconnected within the porous polymer matrix.

The outer shell on the secondary particle can provide a stable barrier that can allow the SEI to form while inhibiting electrolyte solvents from penetrating into areas surrounding the Li-active materials as well as helping to eliminate the swelling of the secondary particle.

In some embodiments an outer layer may be applied to the surface of a primary or secondary particle by thermally decomposing a polymer that unzips into a vaporized state. The effect of this process could be used to alter the surface energy of the particle to interact more favorably with the surrounding environment. For example, polytetrafluoroethylene may be thermally decomposed into tetrafluoroethylene monomer at about 600° C. and above, which could lower surface polarity of the particle surface making it more compatible with low polarity surroundings.

The outer shell can include a polymer or a combination of polymers. The outer shell can include PAN, polystyrene, PPy, PAA or a combination thereof. The polymer(s) of the outer shell can be crosslinked.

In some embodiments, an outer polymer is applied to the secondary particles by in situ polymerization of a monomer such as acrylonitrile, pyrrole, acrylic acid or functionalized polystyrene. Exposure of the secondary particles to vaporized monomer and a polymerization initiator can allow the monomer to become adsorbed on surfaces of the secondary particles in the presence of the initiator. Then by controlled heating to the initiator's decomposition temperature, polymerization may occur resulting in the formation of a polymer film on the surfaces and in pores of the secondary particles. The resulting coating can be a polymer layer that can be electron-conductive or ion-conductive and, due to its conformity, can add rigidity to the secondary particle.

Outer layers can further be applied by a low-temperature chemical vapor deposition (CVD) process, which can be described as in situ polymerization. Further heating to cure nitrile polymers in a cyclization process can cross-link the other polymer strands into a continuous composite. This can be accomplished while preserving the morphology of the micron-sized secondary particles and without using solvents in the process.

In some embodiments, layers may be applied to modify the surface of the secondary particles. Functional groups may be applied that interact favorably with the electrode materials blended with the secondary particles to enhance such properties as particle durability, particle dispersion, SEI formation and stability, ion mobility, or electron conductance.

In some embodiments, an outer layer on the secondary particle is applied by combining a conducting polymer with the micron-sized particle, while dry mixing the two is performed. The micron-sized secondary particle can have surface chemistry that is favorable for interactions with a conducting polymer. The conducting polymer may include a dopant that may possess functional groups to provide covalent or ionic bonding to the surfaces of the micron-sized secondary particle. Mild heating may be required to cure the coating.

In some embodiments, an outer layer on the secondary particle is applied by infusing vaporized reagents that will polymerize at a low temperature with the aid of a polymerization initiator. The secondary particle can be conformally coated by the polymer formed in situ. Mild heating may be required to initiate polymerization to ensure curing of the coating.

6. Exemplary Optional Surface Modifiers

In some embodiments, a surface modifier is derived from acrylonitrile, pyrrole, polypyrrole, polyacrylonitrile, perfluoroalkylethylenes, acetylene, ethylene, propylene (or other 1-alkenes C12 or less), 1-alkynes (C12 or less). Exemplary perfluoroalkylethylenes may be fluorinated alkenes or fluorinated alkynes. Exemplary perfluoroalkylethylenes may include polytetrafluoroethylene (PTFE).

C. Exemplary Amounts of Chemical Constituents

The secondary particle can include the primary particle at varying amounts. For example, the secondary particle can include the primary particle at about 1% to about 88% by total weight (wt. %) of the secondary particle. In various implementations, the secondary particle may include the primary particle at no less than 1 wt. %; no less than 5 wt. %; 10 wt. %; no less than 15 wt. %; no less than 20 wt. %; no less than 30 wt. %; no less than 40 wt. %; no less than 45 wt. %; no less than 50 wt. %; no less than 60 wt. %; no less than 70 wt. %; no less than 80 wt. %; no less than 85 wt. %; or no less than 88 wt. %. In various implementations, the secondary particle may include the primary particle no greater than 88 wt. %; no greater than 85 wt. %; no greater than 80 wt. %; no greater than 75 wt. %; no greater than 65 wt. %; no greater than 55 wt. %; no greater than 45 wt. %; no greater than 35 wt. %; no greater than 25 wt. %; no greater than 15 wt. %; no greater than 10 wt. %; no greater than 5 wt. %; or no greater than 1 wt. %.

In some embodiments, the secondary particle may include ion-conducting polymer at about 2% to about 50% by total weight of the secondary particle. In various implementations, the secondary particle may include ion-conducting polymer at no less than 2 wt. %; no less than 5 wt. %; no less than 10 wt. %; no less than 20 wt. %; no less than 30 wt. %; no less than 40 wt. %; or no less than 45 wt. %. In various implementations, the secondary particle may include ion-conducting polymer at no greater than 50 wt. %; no greater than 45 wt. %; no greater than 35 wt. %; no greater than 25 wt. %; no greater than 15 wt. %; or no greater than 5 wt. %.

In some embodiments, the secondary particle may include electron-conducting polymer at about 0.1% to about 20% by total weight of the secondary particle. In various implementations, the secondary particle may include electron-conducting polymer at no less than 0.1%, no less than 0.5%; no less than 1 wt. %; no less than 2 wt. %; no less than 3 wt. %; no less than 4 wt. %; no less than 5 wt. %; no less than 6 wt. %; no less than 7 wt. %; no less than 8 wt. %; or no less than 9 wt. %; no less than 11 wt. %; no less than 13 wt. %; no less than 15 wt. %; no less than 17 wt. %; or no less than 19 wt. %. In various implementations, the secondary particle may include electron-conducting polymer at no greater than 20 wt. %; no greater than 18 wt. %, no greater than 16 wt. %; no greater than 14 wt. %; no greater than 12 wt. %; no greater than 10 wt. %; no greater than 9 wt. %; no greater than 8 wt. %; no greater than 7 wt. %; no greater than 6 wt. %; no greater than 5 wt. %; no greater than 4 wt. %; no greater than 3 wt. %; or no greater than 2 wt. %; no greater than 1%; or no greater than 0.5%.

In some embodiments, the secondary particle may include flexible polymer at about 0% to about 10% by total weight of the secondary particle. In various implementations, the secondary particle may include flexible polymer at no less than 0.5%; no less than 1 wt. %; no less than 2 wt. %; no less than 3 wt. %; no less than 4 wt. %; no less than 5 wt. %; no less than 6 wt. %; no less than 7 wt. %; no less than 8 wt. %; or no less than 9 wt. %. In various implementations, the secondary particle may include flexible polymer at no greater than 10 wt. %; no greater than 9 wt. %; no greater than 8 wt. %; no greater than 7 wt. %; no greater than 6 wt. %; no greater than 5 wt. %; no greater than 4 wt. %; no greater than 3 wt. %; or no greater than 2 wt. %.

Exemplary secondary particles comprising a porous polymer matrix comprising PAN/PPy composites may have various weight ratios of PAN to PPy. In various implementations, exemplary porous polymer matrices may have a weight ratio of PAN to PPy between about 95:5 and 80:20; between 90:10 and 80:20; between 95:5 and 85:15; or between 95:5 and 90:10. In various implementations, exemplary porous polymer matrices may have a weight ratio of PAN to PPy no less than 80:20; no less than 83:17; no less than 86:14; no less than 89:11; no less than 92:8; or no less than 95:5. In various implementations, exemplary porous polymer matrices may have a weight ratio of PAN to PPy no greater than 95:5; no greater than 92:8; no greater than 89:11; no greater than 86:14; no greater than 83:17; or no greater than 80:20.

D. Various Properties of Exemplary Secondary Particles

Figure 4A:
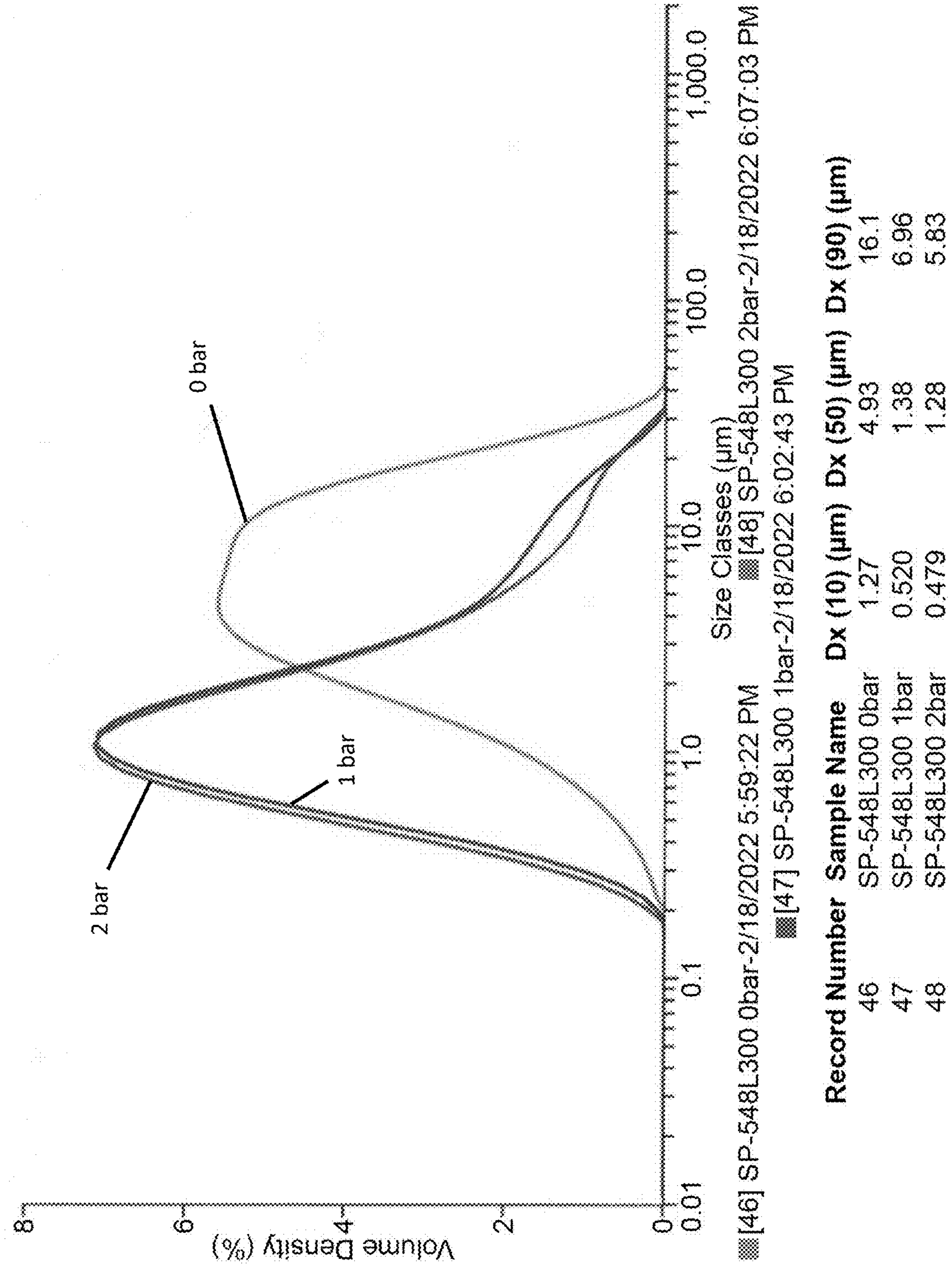
FIG. 4A and FIG. 4B show experimental examples of secondary particle size distributions measured by a Malvern Mastersizer with a dry powder accessory. The results show measurements taken with 0-bar, 1-bar and 2-bar pressure used to disperse dry powder.
Figure 4B:
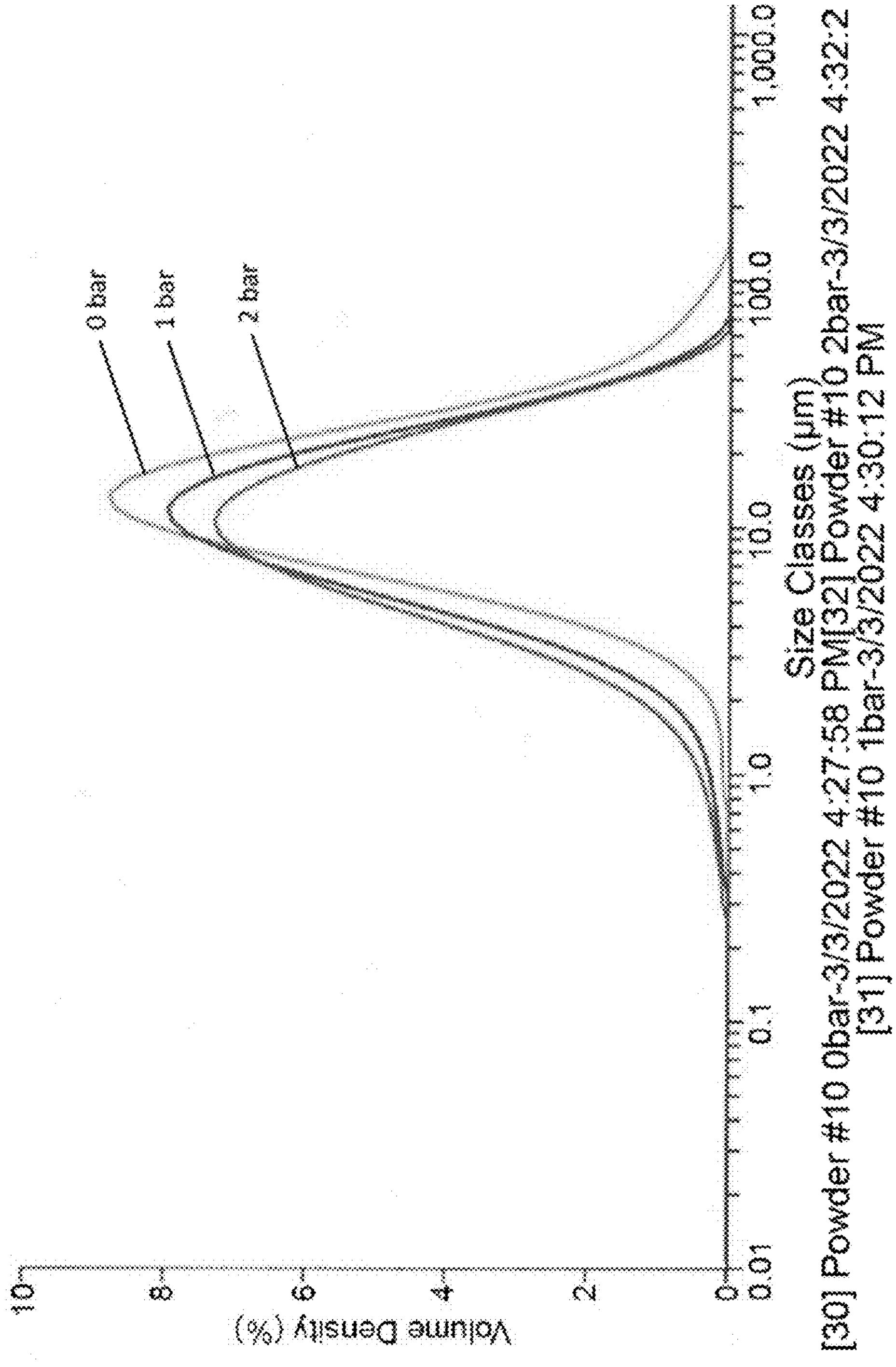

The secondary particle can have various particle sizes. Secondary particle size distributions may be defined by a D50 volume measurement (also referred to as a $D_v50$ size). Exemplary D50 volume measurements may include measurement by laser diffraction methods on dry particles suspended in an air stream. The powder encounters a vortex where it enters the air stream. At 0 bar, the pressure differential that creates the vortex is at about atmospheric pressure. With 1 bar added, the pressure differential across the vortex is about double, and the shear rate forces on the particles entering the gas stream is about 50% higher. As shown in FIG. 4A and FIG. 4B, multiple particle size distribution curves are shown with 0 bar, 1 bar, and 2 bar pressure which increases the shear forces experienced by the particles.

For example, the secondary particle may have a $D_v50$ size of about 1 μm to about 25 μm. In various instances, exemplary secondary particles may have a $D_v50$ size between 1 μm and 25 μm; between 2 μm and 20 μm; between 3 μm and 12 μm; between 5 μm and 10 μm; or between 6 μm and 8 μm. In various instances, exemplary secondary particles may have a $D_v50$ size of no less than 1 μm; no less than 2 μm; no less than 3 μm; no less than 5 μm; no less than 10 μm; no less than 15 μm; no less than 20 μm; or no less than 22.5 μm. In various instances, exemplary secondary particles may have a $D_v50$ size no greater than 25 μm; no greater than 20 μm; no greater than 17.5 μm; no greater than 15 μm; no greater than 12 μm; no greater than 7.5 μm; no greater than 5 μm; or no greater than 2.5 μm.

The primary particle can have various particle sizes. Primary particle size distributions may be defined by a $D_v50$ volume measurement. In the case of the primary particle size distributions, exemplary measurements may be made by dynamic light scattering through dispersions in i-propanol. While the primary particles may be predominately non-spherical, measured particle size distributions are approximated from the Brownian motion of the particles of an average mass translated to volume of a sphere using the density of the material. The actual girth and length of the particles may differ from the idealized diameter of a sphere. Particle aspect ratios may vary from 1:1 to as much as 1:5 or even greater.

For example, the primary particle may have a $D_v50$ size of about 20 nm to about 250 nm. In various instances, exemplary primary particles may have a $D_v50$ size between 20 nm and 250 nm; between 25 nm and 200 nm; between 50 nm and 150 nm; between 100 nm and 250 nm; or between 75 nm and 225 nm. In various instances, exemplary primary particles may have a D. 50 size no less than 20 nm; no less than 50 nm; no less than 75 nm; no less than 100 nm; no less than 125 nm; no less than 150 nm; or no less than 175 nm. In various instances, exemplary primary particles may have a $D_v50$ size no greater than 250 nm; no greater than 225 nm; no greater than 200 nm; no greater than 175 nm; no greater than 150 nm; no greater than 125 nm; no greater than 100 nm; no greater than 75 nm; no greater than 50 nm; or no greater than 25 nm.

Exemplary secondary particles may have various hardness values. For instance, exemplary secondary particles may have a hardness between about 150 MPa and about 3000 MPa. In various instances, exemplary primary particles may have a hardness between 150 MPa and 3000 MPa; between 150 MPa and 1500 MPa; between 1500 MPa and 3000 MPa; between 500 MPa and 2500 MPa; or between 2000 MPa and 3000 MPa. In various instances, exemplary secondary particles may have a hardness no less than 150 MPa; no less than 200 MPa; no less than 250 MPa; no less than 400 MPa; no less than 500 MPa; no less than 600 MPa; no less than 750 MPa; no less than 1000 MPa; no less than 1250 MPa; no less than 1500 MPa; no less than 1750 MPa; no less than 2000 MPa; no less than 2250 MPa; no less than 2500 MPa; or no less than 2750 MPa. In various instances, exemplary secondary particles may have a hardness no greater than 3000 MPa; no greater than 2750 MPa; no greater than 2500 MPa; no greater than 2250 MPa; no greater than 2000 MPa; no greater than 1750 MPa; no greater than 1500 MPa; no greater than 1250 MPa; no greater than 1000 MPa; no greater than 750 MPa; no greater than 500 MPa; no greater than 450 MPa; no greater than 400 MPa; no greater than 350 MPa; no greater than 300 MPa; no greater than 250 MPa; no greater than 200 MPa; or no greater than 150 MPa.

Exemplary secondary particles may have various elasticity values. For instance, exemplary secondary particles may have an elasticity between about 200 MPa and about 42,000 MPa. In various instances, exemplary secondary particles may have an elasticity between 200 MPa and 42,000 MPa; between 200 MPa and 20,000 MPa; between 20,000 MPa and 42,000 MPa; or between 5000 MPa and 30,000 MPa In various instances, exemplary secondary particles may have an elasticity no less than 200 MPa; no less than 400 MPa; no less than 600 MPa; no less than 800 MPa; no less than 1000 MPa; no less than 1200 MPa; no less than 1400 MPa; no less than 1600 MPa; no less than 1800 MPa; no less than 2000 MPa; no less than 4000 MPa; no less than 8000 MPa; no less than 10,000 MPa; no less than 15,000 MPa; no less than 20,000 MPa; no less than 25,000 MPa; no less than 30,000 MPa; no less than 35,000 MPa; or no less than 40,000 MPa. In various instances, exemplary secondary particles may have an elasticity no greater than 42,000 MPa; no greater than 37,000 MPa; no greater than 32,000 MPa; no greater than 27,000 MPa; no greater than 22,000 MPa; no greater than 17,000 MPa; no greater than 15,000 MPa; no greater than 12,000 MPa; no greater than 11,000 MPa; no greater than 10,000 MPa; no greater than 7500 MPa; no greater than 5000 MPa; no greater than 2500 MPa; no greater than 2100 MPa; no greater than 2000 MPa; no greater than 1800 MPa; no greater than 1600 MPa; no greater than 1400 MPa; no greater than 1200 MPa; no greater than 1000 MPa; no greater than 800 MPa; no greater than 500 MPa; or no greater than 300 MPa.

Measurement of electrical conductivity properties disclosed herein can be accomplished by measuring resistivity across an area of pressed wafers made by pressing powdered samples in a 14 mm diameter die with 20 MPa pressure. The resistance is measured by making contact with a clamp of area A and measuring resistance with an ohm meter. Each conductivity measurement represents resistance measurements that is repeated three times and averaged. The conductivity $\sigma$ [$S\times cm^{-1}$] is calculated by considering the amount of the material (contact area and thickness) by the following relationships.

$$\sigma = \frac{1}{\rho} \quad \rho = \frac{RA}{L}$$

where $\rho$ is the resistivity [$\Omega\times cm$], R is the measured resistance [$\Omega$], A is the area of the contact between the wafer and the cell clamps, and L is the wafer thickness.

Exemplary secondary particles may have various conductivity values. For example, exemplary secondary particles may have a conductivity value between about $10^{-3}$ $S\times cm^{-1}$ and about $10^{-6}$ $S\times cm^{-1}$. In various instances, exemplary secondary particles may have a conductivity value between $10^{-3}$ $S\times cm^{-1}$ and $10^{-6}$ $S\times cm^{-1}$; between $10^{-4}$ $S\times cm^{-1}$ and $10^{-6}$ $S\times cm^{-1}$; between $10^{-3}$ $S\times cm^{-1}$ and $10^{-5}$ $S\times cm^{-1}$; or between $10^{-3}$ $S\times cm^{-1}$ and $10^{-4}$ $S\times cm^{-1}$. In various instances, exemplary secondary particles may have a conductivity value no less than $10^{-6}$ $S\times cm^{-1}$; no less than $10^{-5}$ $S\times cm^{-1}$; no less than $10^{-4}$ $S\times cm^{-1}$; or no less than $10^{-3}$ $S\times cm^{-1}$. In various instances, exemplary secondary particles may have a conductivity value no greater than $10^{-3}$ $S\times cm^{-1}$; no greater than $10^{-4}$ $S\times cm^{-1}$; no greater than $10^{-5}$ $S\times cm^{-1}$; or no greater than $10^{-6}$ $S\times cm$.

Exemplary secondary particles may be used as Li-active materials in secondary batteries to greatly enhance energy density of the negative electrode. The proportion of the exemplary secondary particles in the negative electrode can vary from as little as 1% to as much as 100% of the active materials, the balance being graphite, which has a nominal theoretical capacity of 372 mAh/g. The active Si in the exemplary particles can itself vary it is typically within in a range from about 25% to as high as 88% Si. Thus, the instant exemplary particles may be used to increase the energy density of the negative electrode from just over the energy density of a graphite electrode to a negative electrode with as high as 3,150 mAh/g for the case where the exemplary particles comprise 100% of the active materials.

Exemplary secondary particles may have various elastic modulus values. For instance, exemplary secondary particles may have an elastic modulus between about 18,000 MPa and about 22,000 MPa. In various instances, exemplary secondary particles may have an elastic modulus between 18,000 MPa and 22,000 MPa; between 18,000 MPa and 20,000 MPa; between 20,000 MPa and 22,000 MPa; or between 19,000 MPa and 21,000 MPa. In various instances, exemplary secondary particles may have an elastic modulus no less than 18,000 MPa; no less than 19,000 MPa; no less than 20,000 MPa; no less than 21,000 MPa; or no less than 22,000 MPa. In various instances, exemplary secondary particles may have an elastic modulus no greater than 22,000 MPa; no greater than 21,000 MPa; no greater than 20,000 MPa; no greater than 19,000 MPa; or no greater than 18,000 MPa.

Exemplary secondary particles may have various elastic recovery percentage values. For instance, exemplary secondary particles may have an elastic recovery percentage between about 13% and about 17%. In various instances, exemplary secondary particles may have an elastic recovery percentage between 13% and 17%; between 13% and 15%; between 15% and 17%; or between 14% and 16%. In various instances, exemplary secondary particles may have an elastic recovery percentage no less than 13%; no less than 14%; no less than 15%; no less than 16%; or no less than 17%. In various instances, exemplary secondary particles may have an elastic recovery percentage no greater than 17%; no greater than 16%; no greater than 15%; no greater than 14%; or no greater than 13%.

Exemplary secondary particles may be characterized by an FTIR spectrum of the porous polymer matrix. In some instances, an FTIR spectrum of a porous polymer matrix comprising the PAN/PPy composite prior to heat processing may have a —C≡N stretching frequency between 2240.75 $cm^{-1}$ and 2239.0 $cm^{-1}$.

Figure 5B:
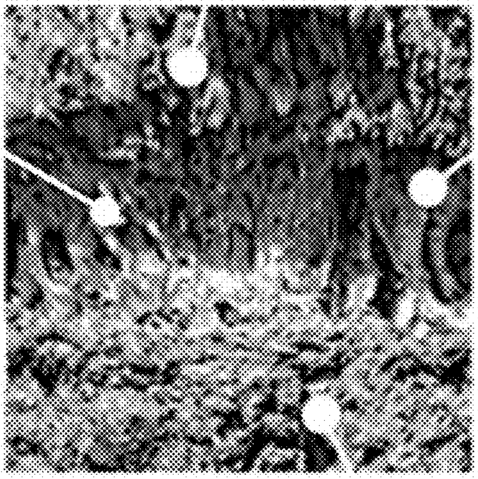
FIG. 5B shows an image of a polymer matrix with fibral strands connecting portions of the polymer matrix and defining crazed channels.

Exemplary porous polymer matrices may comprise fibral strands. For instance, exemplary porous polymer matrices may comprise a plurality of fibral strands linking portions of the porous polymer matrix and defining a plurality of crazes. An example cross-sectional view of a polymer matrix, fibral strands, and crazed channels, is shown in FIG. 5B. Without being bound by a particular theory, it is hypothesized that the presence of crazes in exemplary porous polymer matrices may stop or slow the formation of cracks in exemplary secondary particles.

III. EXEMPLARY METHODS

Figure 2:
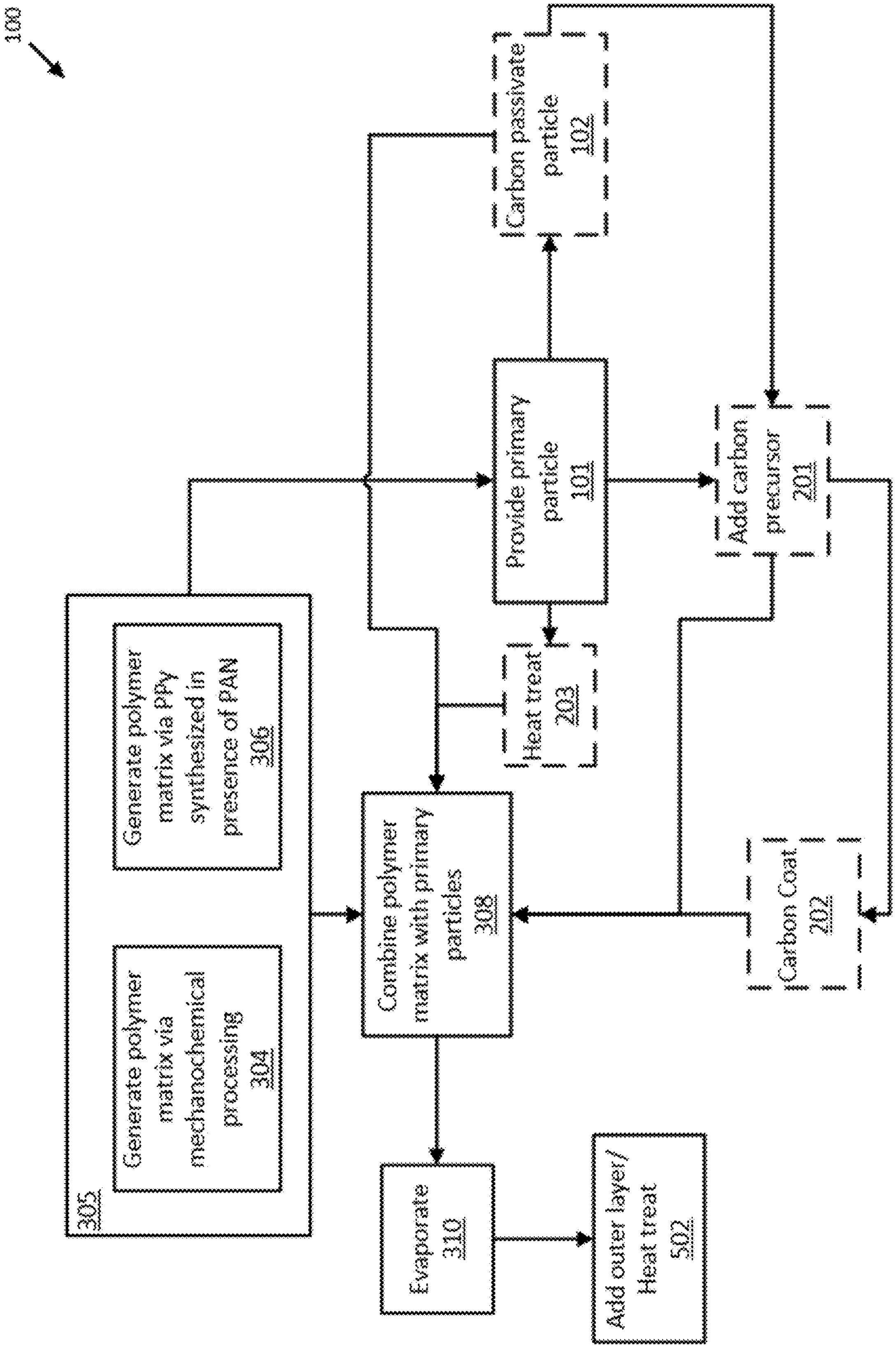
FIG. 2 shows a schematic flow diagram of an example method of making a secondary particle.

Various aspects of exemplary methods are described below. For instance, FIG. 2 shows an exemplary method 200 of making a secondary particle. As shown, exemplary method 200 includes providing a primary particle (operation 101), carbon passivating a primary particle (operation 102), adding a carbon precursor (operation 201), carbon coating (operation 202), heat treating (operation 203), generating a polymer matrix (operation 305), combining a polymer matrix with primary particles (operation 308), evaporating (operation 310), and adding an outer layer and/or heat treating (operation 502). In FIG. 2, dashed operations are optional. Operation 305 may include generating a polymer matrix via mechanochemical processing (operation 304) or generating a polymer matrix via synthesizing PPy in the presence of PAN (operation 306). Other embodiments may include more or fewer operations.

A. Exemplary Methods of Preparing Primary Particles

Exemplary methods may include providing a primary particle (operation 101). In some instances, exemplary methods are agnostic to a source of the primary particle, particularly when the primary particle comprises silicon. Operations 101, 102, 201, 202, and 203 relate to preparing exemplary primary particles and are discussed below, unless otherwise indicated.

Figure 3:
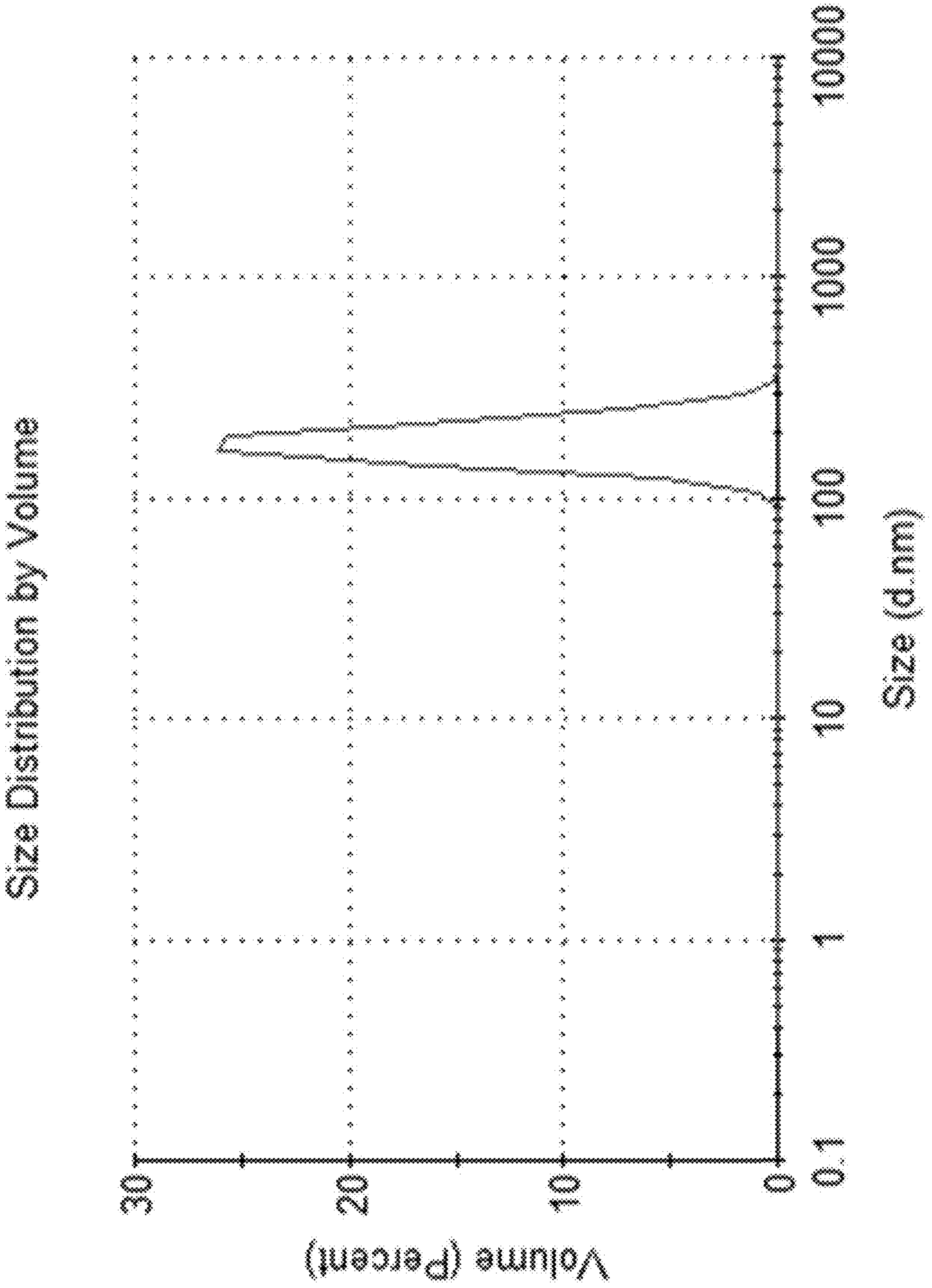
FIG. 3 shows a plot of size distribution by volume of example primary particles. Measurements were taken on a Malvern Zetasizer with the particles dispersed by sonication in i-propyl alcohol. The results are the average of 3 measurements.

The primary particle may be prepared by wet-milling micron-sized bulk silicon or silicon alloys. In some embodiments, the wet milling is done under an inert atmosphere and in an inert non-competing solvent. Alloying elements may be used in the milling process to form alloy phases that are not present in the bulk feed material. The addition of other reagents at any time during or immediately after the milling process has ended can be done in a circulating media mill, which can allow flexibility in controlling particle size and surface characteristics of the primary particle. A typical primary particle size distribution from a media mill is shown in FIG. 3.

In some embodiments, the primary particle is made from silanes or its halide analogs. These can include but are not limited to dichlorosilane, hexachlorodisilane, monochlorosilane, disilane, polysilanes, silicon tetrachloride, tetrachlorosilane, etc. In some embodiments silanes may be infused into a conductive carbon matrix from which primary particles can be formed.

In some embodiments, the bulk materials are processed in a high-energy ball mill (HEBM). This may be advantageous for the preparation of certain alloys that can be difficult to fracture and can resist processing in a circulating media mill.

In another embodiment, the primary particle is produced by wet milling and may be isolated from solvents by evaporation of the solvent. Optionally, solvents may be partially removed by centrifugal separation followed by evaporation of the solvent in any manner that limits exposure of the particles to oxygen. Solvent may be evaporated by evacuation. Solvents may be evaporated by contacting circulated inert gas, such as nitrogen ($N_2$) or noble gases. Solvents may be evaporated by contacting circulated formation gas, e.g., gas as inert gas with 3-10% partial pressure of $H_2$. Particles isolated from inert solvents may be highly reactive to oxygen without passivation by surface modifier.

The surfaces of the primary particle may be passivated by applying a carbon precursor to the surface as exemplified by operation 201. Carbon precursors may be applied to the surfaces in the milling process or by addition of a hydrocarbon after the milling process followed by evaporation of solvents. Carbon precursors may be reduced to a hard or soft carbon matrix by moderate heat processing under inert atmosphere. Example carbon precursors include, but are not limited to, petroleum pitch, polycyclic aromatic hydrocarbons, algae, saccharides, fatty acids, amides, amines, acrylics, imides, urethanes, glycols, pyrroles, alkenes, alkynes. Carbon precursors may be applied during a heat process by contacting the particles with a vaporized carbon precursor as exemplified by operations 102 and 202.

The primary particles may be combined with one or more polymers or copolymers forming a partial or a complete coating on the primary particle. Upon evaporation of solvent from an aerosol, micron-sized composite particles (e.g., secondary particles) with the primary particles embedded in the secondary particle. Polymers can impart multiple functions to, e.g., enhance mechanical stability and conductive properties of the secondary particle.

In some embodiments, doped PPy is applied to surfaces of the primary particle. Doped PPy coatings on the primary particle may passivate a surface of the primary particle. Doped PPy coatings on the primary particle may provide a conductive coating on the primary particle surfaces. Doped PPY coatings on the primary particle may interact favorably with other components in the secondary particle matrix.

B. Exemplary Methods of Preparing Polymer Matrices

Polymers used in this disclosure may be purchased commercially and applied unmodified, or they may be modified before applying for the purpose of improving a particular property of the matrix. Polymers may also be formed in situ from the monomers. Generating a polymer matrix (operation 305) may include various operations.

PAN may be processed to reduce its particle size distribution prior to combining with the other components in the secondary particles. Reduction of particle size may be accomplished by milling the PAN powder in an alkane solvent such as cyclohexane. Ideally, PAN particles are reduced in diameter to less than 10% of the diameter of the secondary particles.

When used, PPy may be made by various methods known in the art. Exemplary synthesis schemes are described in Liu et al., Oxidative Template for Conducting Polymer Nanoclips; (b) J. Am. Chem. Soc. 2010, 132, 38, 13158-13159, incorporated by reference in its entirety. In some instances, PPy may be doped with bromide or chloride. In some instances, PPy may be doped with DBSA.

In some instances, PPy may be synthesized by dispersing tetradecyltrimethylammonium bromide (TTABr) in aqueous HCl. That mixture may be stirred for a period of time. For instance, that mixture may be vigorously stirred for 1 hour. After stirring, ammonium persulfate (APS) may be added to the mixture and stirred. In some instances, the weight of APS added may be equal to, or up to about 30% more than the weight of TTABr added. After adding the APS and stirring, the reaction mixture may be cooled. Then, pyrrole monomer may be added to the cooled reaction mixture. Adding pyrrole monomer may be performed dropwise. Generally, a weight ratio of pyrrole monomer:TTABr:APS may vary, provided that their molar ratio is about 1:0.25:0.4. Polymerization may be allowed to proceed at about 0-5° C. for about 24 hours. A resulting black precipitate of Br-doped PPy may be washed, centrifuged, and dried.

In some instances, a polymer matrix may be made by generating a polymer matrix via synthesizing PPy in the presence of PAN (operation 306). The PAN/PPy composites possess much greater electrical conductivity than the two pure polymers blended together in the same weight proportions.

Broadly, operation 306 may include various operations. For instance, generating a polymer matrix via synthesizing PPy in the presence of PAN may include combining pyrrole in acidic media with an ammonium bromide-containing material and with polyacrylonitrile (PAN) to yield a reactant mixture. Next, the reactant mixture may be agitated to generate a homogenous emulsion. Then a reaction initiator may be added to the homogenous emulsion to generate a reaction mixture. In some instances, the reaction initiator may comprise ammonium persulfate (APS) or anhydrous ferric chloride. Then the reaction mixture may be agitated for at least 24 hours to generate a product mixture. The product mixture may be centrifuged to yield polymer matrix materials.

In some instances, a polymer matrix may be made by generating a polymer matrix via mechanochemical processing (operation 304). Operation 304 may include combining polymers in a non-polar solvent, where the polymers comprise polyacrylonitrile (PAN) and polypyrrole (PPy). In some instances, the PPy may be doped.

PAN and PPy, doped or undoped, may be combined (operation 304) in various ratios. In various implementations, PAN and PPy may be combined in a weight ratio of PAN to PPy between 50:50 and 95:5; between 50:50 and 80:20; between 60:40 and 95:5; or between 75:25 and 95:5. In various implementations, PAN and PPy may be combined in a weight ratio of PAN to PPy of no less than 50:50; no less than 60:40; no less than 70:30; no less than 75:25; no less than 80:20; no less than 85:15; no less than 90:10; or no less than 95:5. In various implementations, PAN and PPy may be combined in a weight ratio of PAN to PPy of no greater than 50:50; no greater than 60:40; no greater than 70:30; no greater than 75:25; no greater than 80:20; no greater than 85:15; no greater than 90:10; or no greater than 95:5. Various other contemplated ratios are provided in greater detail above.

The combined solvent and polymers may be comminuted in a circulating bead mill. In some instances, comminution is performed in an anaerobic environment. For instance, comminution may be conducted in a nitrogen ($N_2$) or other inert gas, atmosphere. In some instances, comminution is performed in an aerobic environment.

A rotor tip speed during comminution may be no less than 11 meters per second (m/s) and no greater than 14 m/s. In various implementations, a rotor tip speed during comminution may be no less than 11 m/s; no less than 12 m/s; no less than 13 m/s; or no less than 14 m/s. In various implementations, a rotor tip speed during comminution may be no greater than 14 m/s; no greater than 13 m/s; no greater than 12 m/s; or no greater than 11 m/s.

Comminution of polymers and solvent may be conducted for various time periods. In various implementations, comminution may be performed for no less than 200 minutes; no less than 210 minutes; no less than 220 minutes; no less than 230 minutes; no less than 240 minutes; no less than 250 minutes; no less than 260 minutes; no less than 270 minutes; no less than 280 minutes; no less than 290 minutes; no less than 300 minutes; no less than 310 minutes; no less than 320 minutes; or no less than 330 minutes. In various implementations, comminution may be performed for no greater than 200 minutes; no greater than 210 minutes; no greater than 220 minutes; no greater than 230 minutes; no greater than 240 minutes; no greater than 250 minutes; no greater than 260 minutes; no greater than 270 minutes; no greater than 280 minutes; no greater than 290 minutes; no greater than 300 minutes; no greater than 310 minutes; no greater than 320 minutes; or no greater than 330 minutes.

Without being bound by a particular theory, it is hypothesized that the applied mechanical force during milling/comminution brings PPy and PAN segments in intimate contact. Exemplary schematics of PAN and PPy interactions are shown below.

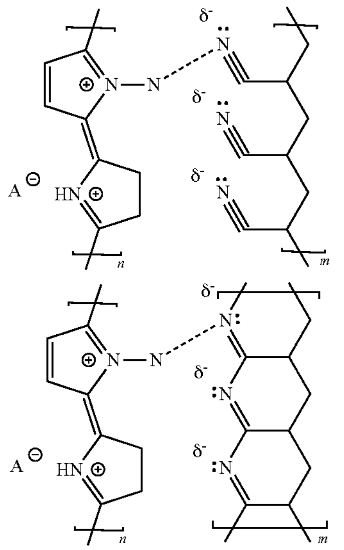

The nitrile groups of PAN can hydrogen bond with PPy to effectively orient the polymers such that electrical conductivity and mechanical properties (hardness and elastic modulus) of the composite are enhanced. The vibrational frequency of free nitrile groups in PAN can be seen to shift as a result of this interaction. Simply mixing the two polymers together does not cause this close contact to occur. Furthermore, mechanical processing of PAN and PPy with exclusion of oxygen may further enhance this interaction. Comparative examples of a 50:50 mixture of PAN and PPy were characterized by FTIR/ATR and exhibited in FIG. 16A, FIG. 16B, and FIG. 16C. This interaction causes the —C≡N stretching frequency to shift by as much as 2 wavenumbers from its natural position. Upon heating to ~290° C., the nitrile groups on the PAN backbone cyclize to form six-member rings, but the orientation with respect to the PPy polymer is not lost.

In some instances, NBR may be carboxylated. Carboxylation of NBR may make NBR more dispersible in various solvents, such as cyclohexane. Partial carboxylation of the nitrile groups in an NBR copolymer may be accomplished by heating NBR in an aqueous solution of sulfuric acid. After some time near 100° C., a portion of the nitrile groups may hydrolyze to carboxylic acid groups by the following reaction.

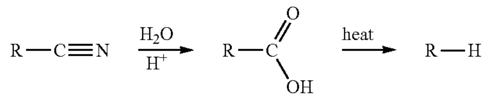

Further heating above ~120° C. may decarboxylate the chain, and may occur when the secondary particles are heat stabilized.

Figure 13:
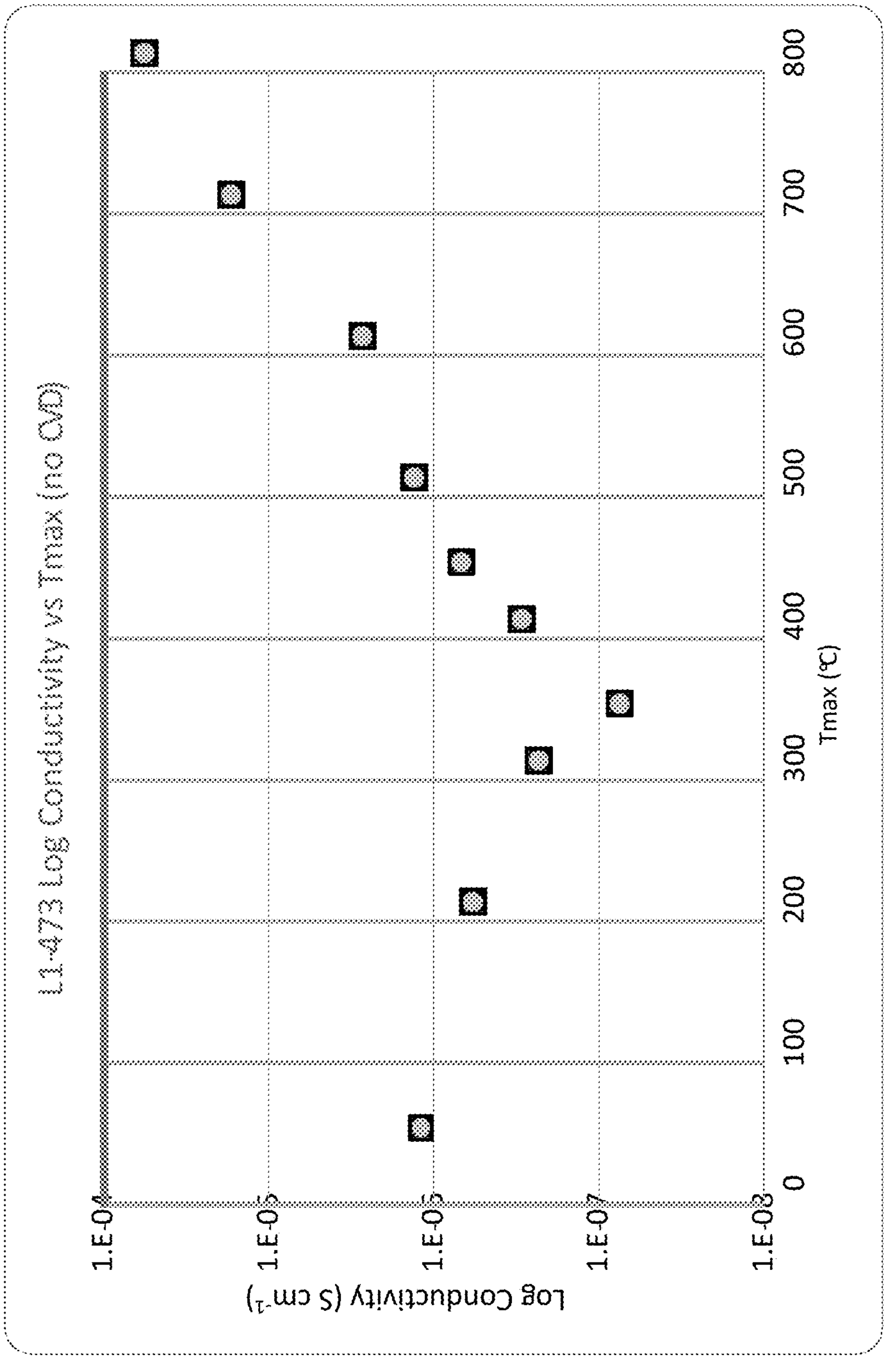
FIG. 13 shows experimental conductivity versus $T_{max}$ data for exemplary secondary particles made with PAN-PPy composite materials before an outer layer is applied to the secondary particles.

In some instances, heat processing may alter the electrical properties of the polymers in the secondary particle matrix. Heat processing in inert atmosphere tends reduce conductivity of matrixes made with PAN/PPy composites. This trend continues until about 350° C. Thereafter, conductivity begins to increase, as shown in FIG. 13.

Two factors that could account for loss of conductivity by heating to temperatures below 350° C. are the loss of dopant from PPy polymer and changes in molecular orientation that disrupts electron mobility as a result of nitrile cyclization in PAN polymers. At higher temperatures, the process of dehydrogenation of cyclized polymers increases the electrical mobility through the formation of a continuum of conjugated C═C π-orbitals.

Treatment of the matrix that suffers from loss in conductivity at temperatures of 350° C. and below with HCl vapor, can restore conductivity. This supports the hypothesis that the initial loss in conductivity as the particles are heated up to 350° C. is primarily from the partial loss of the PPy dopant.

C. Exemplary Methods of Combining Primary Particles and Polymer Matrices

Method 100 can include dispersing the primary particles in a polymer matrix (operation 308). Combining primary particles with a polymer matrix (operation 308) may be conducted by mixing a pre-ground slurry of the polymer particles with the primary particles in a non-polar hydrocarbon solvent. Exemplary non-polar hydrocarbon solvents may include cyclohexane and other non-polar C6-C8 alkane solvents. In some instances, an elastic polymer is included in the slurry with the polymer particles and primary particles.

Combining primary particles with a polymer matrix (operation 308) may be conducted at lower powered mixing relative to milling powers used for comminuting primary particles and/or generating a polymer matrix. Various mixing apparatus may be used during operation 308. For instance, an agitated vessel, mixer, or roller mill may be used.

Typically, operation 308 is performed to avoid comminution of particles. For example, primary particles and polymer particles may be combined at a tip speed no greater than 6 meters per second (m/s). In various instances, primary particles and polymer particles may be combined at a tip speed no less than 4 m/s and no greater than 6 m/s. In various implementations, primary particles and polymer particles may be combined at a tip speed no greater than 6 m/s; no greater than 5 m/s; or no greater than 4 m/s.

Exemplary polymer particles used during operation 308 may be those generated during operation 305, discussed in greater detail above. Exemplary polymer particles comprise PAN. In some instances, exemplary polymer particles are PAN/PPy composite particles disclosed and contemplated herein.

The polymer particles can become cross-linked together in a subsequent heat process (operation 502). Cyclization of the nitrile functional groups in PAN begins to occur at an onset temperature around 275° C. In addition, copolymers with nitrile functional groups can become cross-linked to PAN and can modify the properties of the overall polymer composite.

Moreover, the polymer composite can be stabilized without high-temperature heat processing, whereas carbon matrices formed from carbon precursors usually require heat processes of 700° C. or higher.

In some instances, stabilizing may include heating, radiating, or other methods known in the art. Exemplary heat stabilizing may include heating at a temperature of 850° C. or less. In some instances, heating may be performed at about 290° C. for about 60 minutes.

Electrically conductive optionally doped polymers can be disposed in any part of the secondary particle to increase electrical conductivity. In some embodiments, doped PPy is added to a slurry comprising the primary particles in an anaerobic environment to provide a dispersion of doped PPy that imparts conductivity uniformly throughout the polymer composite.

In some embodiments, an elastic polymer may be dispersed in the slurry of the primary particle along with PAN and PPy. In some embodiments, the elastic polymer includes POE. In some embodiments, the elastic polymer includes NBR.

In some instances, an alkyl tail can be grafted onto an NBR copolymer. This can be accomplished by grafting a 1-alkene to NBR. In some embodiments, a primary thiol can be grafted to NBR. In this embodiment, a polymer initiator, such as benzoyl peroxide (BPO), can be used as the radical initiator to graft 1-decanethiol to NBR. The grafting of the alkyl sulfide tail on NBR can saturate the butadiene segments (which can eliminate reactive double bonds) and can aid the copolymer's solubility in cyclohexane and other non-polar hydrocarbon solvents. In some instances, an NBR polymer may be terminated with carboxyl groups at a relatively low molecular weight (i.e., ca. 3,800 g/mole).

Polymer matrix may be combined with primary particles (operation 308) in various ways. For instance, in some embodiments, the primary particle is fluidized in a solvent and combined with a polymer. The polymer may be dissolved in the solvent or may be dispersed in the solvent in a separate phase.

In some embodiments, the primary particle is fluidized in a solvent and combined with a polymer and a copolymer. At least one polymer or copolymer can be electrically conductive and/or ionically conductive and may be dissolved in the solvent or may be dispersed in the solvent in a separate phase. In addition, at least one polymer can have elastic properties and may be dissolved in the solvent or may be highly dispersed in the solvent. A reagent can be added that can thermodynamically favor establishing internal bridges or cross-links between functional groups of the polymers.

Evaporation (operation 310) may be conducted after combining the polymer matrix with primary particles (operation 308). The solvent can be evaporated (operation 310) in such a manner that the solids are agglomerated into micron-sized particles. Various methods known in the art may be used for micronization of the composites (operation 310). As an example, and without limitation, spray drying may be used for evaporation (operation 310).

An outer layer may be applied to a surface of the secondary particle (operation 502) by dry-mixing secondary particles with nano-scale particles of the desired outer layer materials. In some embodiments, dry mixing is used to disperse polymers on the outer surface of the secondary particles. Example polymers having good electrical conductivity include, but are not limited to, polypyrrole, polythiophene, polyaniline, and poly (3,4 ethylene dioxythiophene). Dispersion by dry mixing can attach these polymers to the surfaces and in pores of the secondary particle.

Mild heating (operation 502) may be used to initiate the reactions of the reactants, which can also be optionally added to the volume of the secondary particles to enhance the adhesion of the conducting polymer to the particle surface. Upon heat processing, the chains of the polymers formed can become cross-linked, which can increase the overall mechanical stability of the secondary particle framework and can potentially inhibit electrolyte solvent penetration into the volume of the secondary particle. In some instances, an outer layer can increase the bulk electrical conductivity of the pellet made of the product powder by at least 1 to 3 orders of magnitude.

In some instances, the generated secondary particle may be heat treated (operation 502) at a predetermined temperature for a predetermined dwell time. In some implementations, the predetermined temperature may be no less than 270° C.; no less than 290° C.; no less than 300° C.; no less than 330° C.; no less than 360° C.; no less than 400° C.; no less than 450° C.; no less than 500° C.; no less than 550° C.; no less than 600° C.; no less than 650° C.; no less than 700° C.; no less than 750° C.; no less than 800° C.; no less than 850° C.; or no less than 900° C. In some implementations, the predetermined temperature may be no greater than 280° C.; no greater than 290° C.; no greater than 300° C.; no greater than 330° C.; no greater than 360° C.; no greater than 400° C.; no greater than 450° C.; no greater than 500° C.; no greater than 550° C.; no greater than 600° C.; no less than 650° C.; no greater than 700° C.; no greater than 750° C.; no greater than 800° C.; no greater than 850° C.; or no greater than 900° C.

In some implementations, the predetermined dwell time may be no less than 50 minutes; no less than 75 minutes; no less than 100 minutes; no less than 120 minutes; no less than 150 minutes; no less than 180 minutes; no less than 210 minutes; or no less than 240 minutes. In some implementations, the predetermined dwell time may be no greater than 50 minutes; no greater than 75 minutes; no greater than 100 minutes; no greater than 120 minutes; no greater than 150 minutes; no greater than 180 minutes; no greater than 210 minutes; or no greater than 240 minutes.

IV. EXEMPLARY IMPLEMENTATIONS

Exemplary secondary particles can be included in a negative electrode composition of secondary batteries. For instance, a negative electrode may comprise active material comprising a secondary particle disclosed and contemplated herein, binder material, and conductive material.

Exemplary secondary particles may be used with liquid electrolyte secondary batteries. Exemplary secondary particles may be used with solid electrolyte secondary batteries.

V. EXPERIMENTAL DATA

Various experiments were conducted and results are discussed below.

Example 1: A 25% dispersion of PAN in cyclohexane was made by milling 250 μm particles of PAN (800 g) with 0.6 mm ceramic media in a circulating bead mill at room temperature for 5 hours. The particle size of the resulting PAN particles was measured by a Malvern Zetasizer suspended in propanol. The particles had a D. (50) of 250 nm.

Example 2: Polysilicon (600 g) was milled with 0.6 mm ceramic beads in cyclohexane for 6 hours. During the last hour 150 g of PAN was added from Example 1 and dispersed in cyclohexane. The solvents were evaporated leaving micron-sized particles of a PAN/n-Si composite. This powder was heated in a rotary furnace under inert atmosphere at 300° C. for 60 minutes. Dry powder particle size $D_v50$ was measured as 6.55 μm Example 3: A quantity of 20 wt % PAN/n-Si composite powder was recirculated in cyclohexane with 5 wt % of dodecylbenzene sulfonic acid (DBSA) doped polypyrrole and 4 wt % of POE (Engage 8003) in a media mill for 2 hours at low rotor speed. Solvents were evaporated leaving micron-sized particles of the composite. The particle size distribution of the dry powder was measured as $D_v50$=18.3 μm.

Example 4: The dry powder from Example 3 was heated in a rotary furnace under inert atmosphere at 300° C. for 60 minutes. The particle size distribution of the heated powder was measured as $D_v50$=14.7 μm.

Example 5: A quantity of 10 wt % PAN/n-Si composite powder was recirculated in cyclohexane with 3 wt % of DBSA doped polypyrrole and 2 wt % of POE (Engage 8003) in a media mill for 2 hours at low rotor speed. Solvents were evaporated leaving micron-sized particles of the composite. The particle size distribution of the dry powder was measured as $D_v50$=16.7 μm.

Example 6: The dry powder from Example 5 was heated in a rotary furnace under an inert atmosphere at 300° C. for 60 minutes. The particle size distribution of the heated powder was measured as $D_v50$=13.6 μm.

Example 7: The dry powder from Example 5+5 wt % of additional DBSA-doped polypyrrole were dry-mixed for 120 minutes in a tumbler vessel. The particle size distribution of the heated powder was measured as 12.1 μm.

Example 8: A quantity of 10 wt % PAN/n-Si composite powder was recirculated in cyclohexane with 3 wt % of DBSA doped polypyrrole and 2 wt % of POE (Engage 8003) in a media mill for 2 hours at low rotor speed. Solvents were evaporated leaving micron-sized particles of the composite. The particle size distribution of the dry powder was measured as $D_v50$=16.7 μm. The resulting dry powder was tumbled in a vessel under inert gas ($N_2$) with 0.5% of a radical initiator dispersed in the powder. Vaporized acrylonitrile was adsorbed on the surface of the powder. Then upon heating to activate the initiator, a polymer film was generated on the surface of the particles forming a conformal coating.

Example 9 (Experimental procedure for making modified NBR by grafting linear 1-alkyl thiols). NBR was dissolved in dichloromethane with the addition of excess benzoyl peroxide (BPO). An excess of 1-decanethiol was added to the mixture with its subsequent thorough agitation until the mixture was well homogenized. The temperature of the reaction mixture was raised to initiate the decomposition of BPO. The whitish waxy fraction, a dimer of 1-decanethiol, and the dense brown fraction, a product of cross-linked NBR, were separated. The product of NBR with grafted mercaptan groups remained dissolved. Cyclohexane was added dropwise to the solution with vigorous stirring. The temperature was raised above the boiling point of dichloromethane, 39.6° C., but below that of cyclohexane, 80.7° C. The temperature was maintained with continued stirring until the dichloromethane was completely evaporated.

Example 10: Micronized bulk silicon material (600 g) was comminuted in cyclohexane with 12 g of DBSA-doped PPy for 240 minutes. Another 12 g of doped PPy and 12 g of the grafted NBR from example 9 was added with continued agitation at reduced speed for an additional 30 minutes. Approximate solids loading in the milled slurry was 16%.

Figure 7:
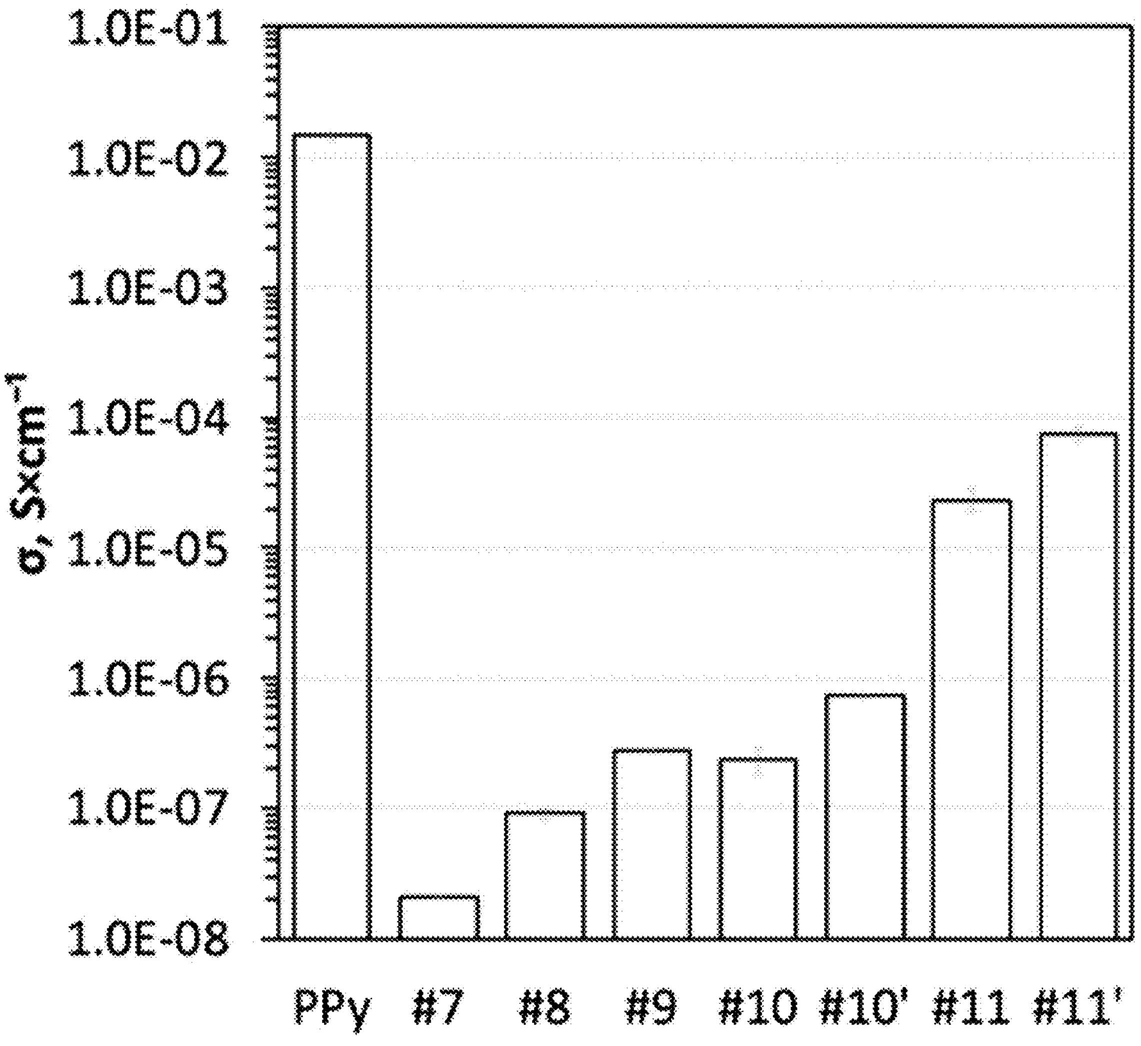
FIG. 7 shows conductivity data for various experimental compositions.
Figure 8:
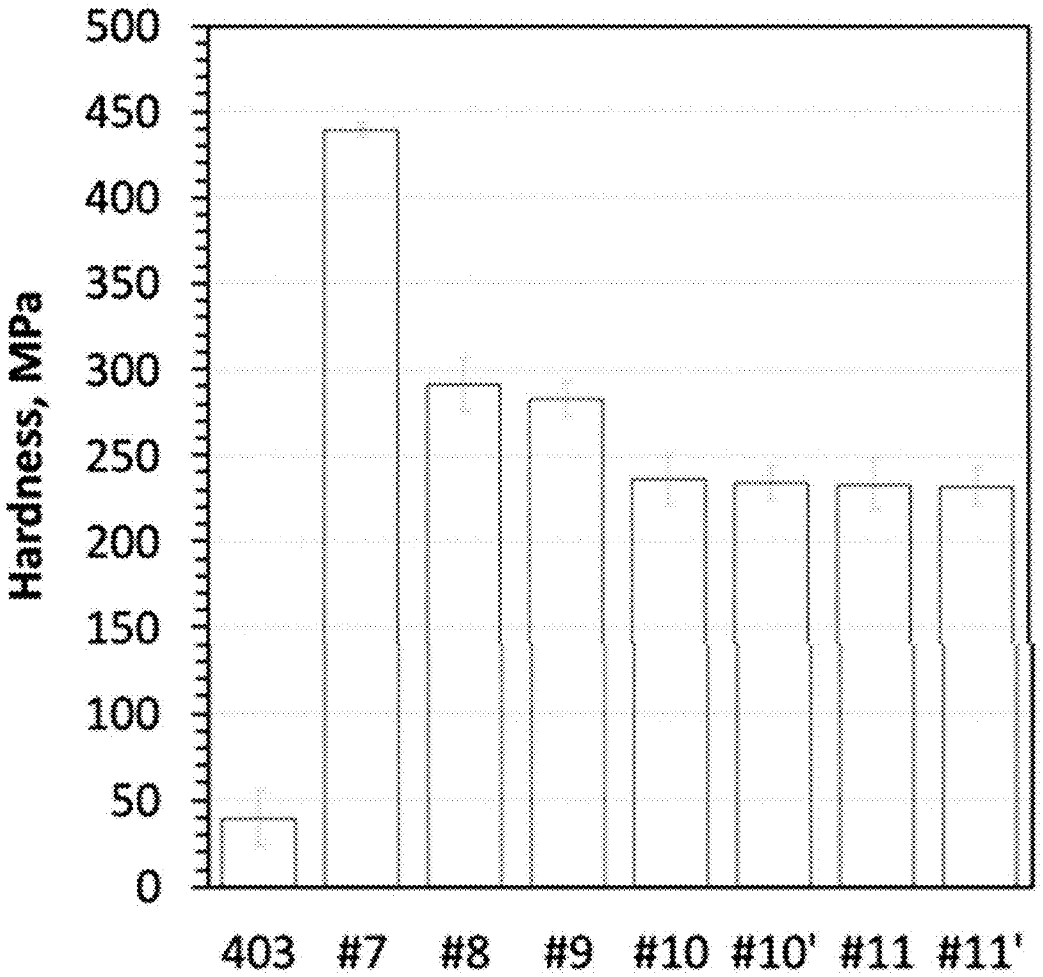
FIG. 8 shows mechanical hardness data for various experimental compositions.
Figure 9:
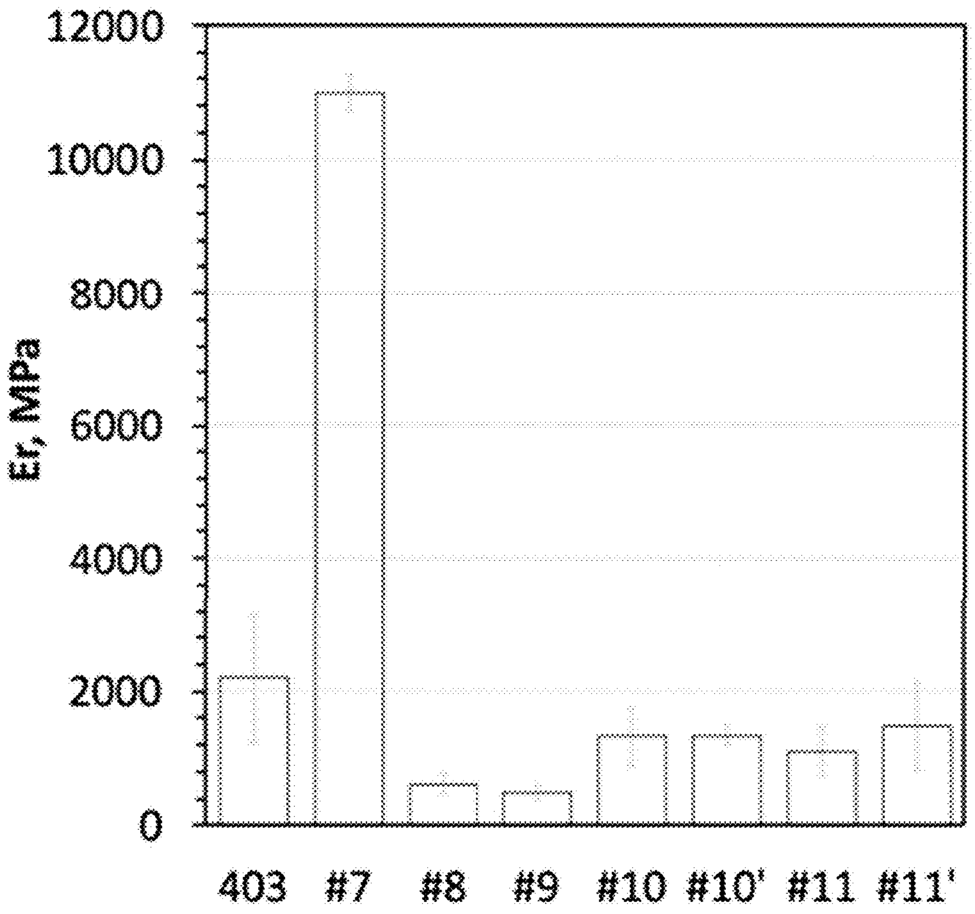
FIG. 9 shows elasticity data for various experimental compositions.

Example 11: Wafers were made from powders and subjected to electrical conductance and mechanical property testing, and the results are shown in FIG. 7, FIG. 8, and FIG. 9. Exemplary powder compositions were mildly heat stabilized at temperatures less than 300° C. Compositions tested included:

PPY: is purified DBSA-doped polypyrrole ($PPy_{DBSA}$)

Powder #7: 80% Si alloy; 20% PAN

Powder #8: 71% Si alloy; 20% PAN; 4% POE; 5% ($PPy_{DBSA}$)

Powder #9: 69% Si alloy; 20% PAN; 4% POE; 5% ($PPy_{DBSA}$)+2% ($PPy_{DBSA}$) added to the surface of the secondary particle.

Powder #10: 75% Si alloy*; 10% PAN; 2% POE; 3% ($PPy_{DBSA}$)

Powder #10': 73% Si alloy*; 10% PAN; 2% POE; 3% ($PPy_{DBSA}$)+2% ($PPy_{DBSA}$) added to the surface of the secondary particle.

Powder #11: 85% Si alloy; 10% PAN; 2% POE; 3% ($PPy_{DBSA}$)

Powder #11': 83% Si alloy; 10% PAN; 2% POE; 3% ($PPy_{DBSA}$)+2% ($PPy_{DBSA}$) added to the surface of the secondary particle.

403: 95% Si alloy; 5% CT (coal tar), heat stabilized to carbonize the CT

Electrical conductance of various compositions was measured by measuring resistance as described above, and the results are shown in FIG. 7. Hardness of various compositions was measured by indentation tests using ASTM E2546-15, and the results are shown in FIG. 8. Elasticity of various compositions was measured by indentation tests using ASTM E2546-15, and the results are shown in FIG. 9.

Figure 10:
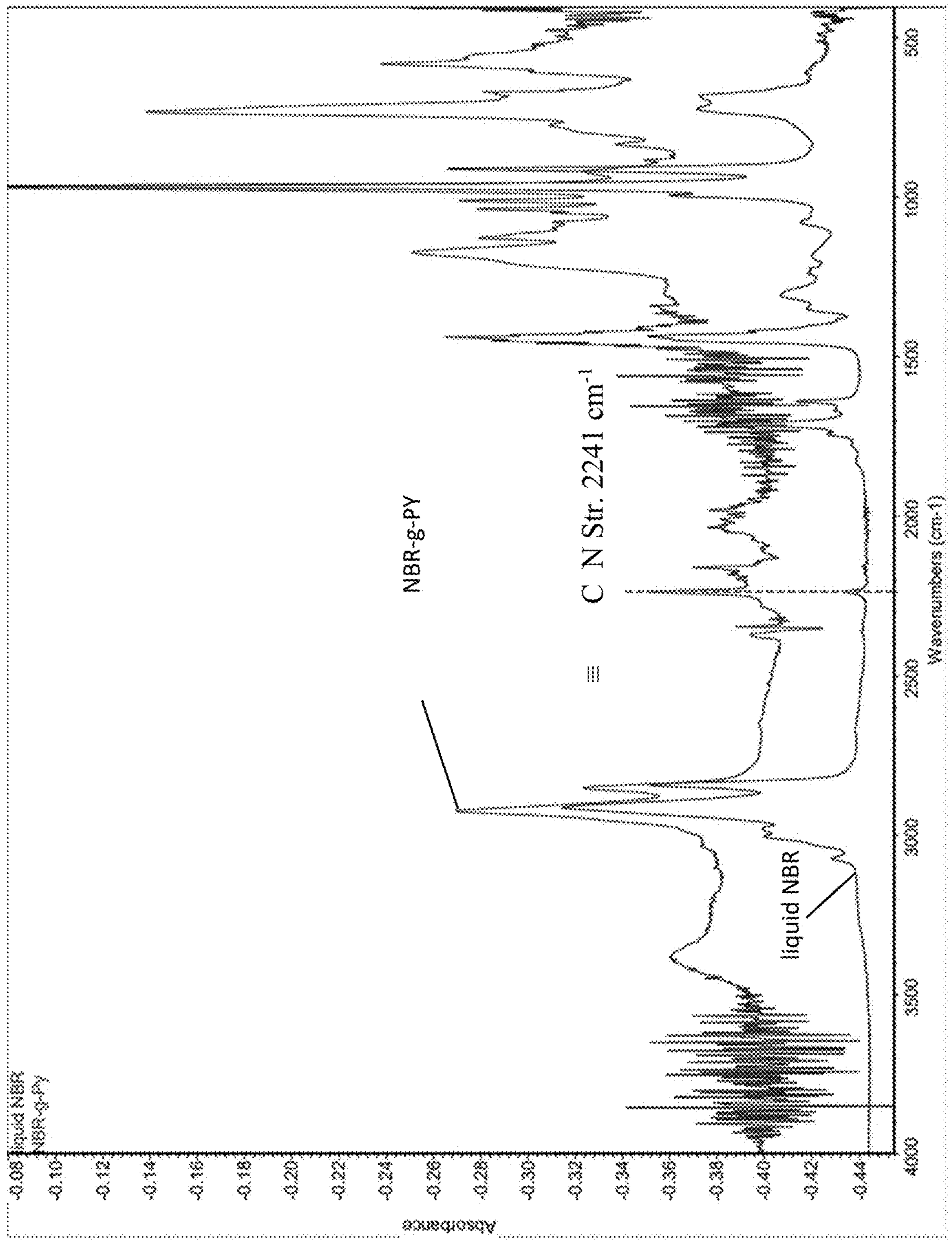
FIG. 10 shows FTIR spectra supporting that pyrrole can be grafted to NBR.

Example 12: Partial carboxylation of the nitrile groups in an NBR copolymer was accomplished by heating NBR in an aqueous solution of sulfuric acid. After some time near 100° C., a portion of the nitrile groups hydrolyzed to carboxylic acid groups. An FTIR spectra was obtained for the carboxylated NBR, and the results are shown in FIG. 10. As shown, in absorbance mode, peak intensity is linearly related to concentration. This will make the nitrile peak representative of the fraction of remaining nitrile groups that have survived the carboxylation.

Example 13: Exemplary PPy was synthesized using the following method. Synthesis was carried out in a 1000 ml reactor. 37.6 g of tetradecyltrimethylammonium bromide (TTABr) was dispersed in 500 mL of 1M aqueous HCl. After vigorous mechanical stirring for 1 hour, 40.8 g of ammonium persulfate (APS) was added with stirring. After continued stirring for an additional 10 min a white precipitate was formed, indicative of a TTABr/APS complex. The reaction mixture was cooled to 0-5° C., after which 30 g of pyrrole monomer was added dropwise. The polymerization was allowed to proceed at 0-5° C. for 24 hours. A black precipitate of Br-doped PPy was washed with deionized water and centrifuged. The black powder was dried for 12 hours at 100° C.

Example 14 A: formation of PPy/PAN composite. In a round bottom flask, 1 g of pyrrole was dissolved in 0.1M HCl (8.3 ml of 37% HCl per 1000 ml of deionized water solution) with the addition of 1.25 g of tetradecyltrimethylammonium bromide (TTABr). Assuming the yield of PPy is about 80% and the PAN:PPy ratio is 80:20, 7.2 g of PAN powder should be added to the reaction mixture. After that, the mixture is left for 12 hrs. at 0-5° C. and vigorous mechanical agitation to achieve a milky homogeneous emulsion. The reaction can then be initiated either by 1.4 g of ammonium persulfate (APS) or 1 g of anhydrous ferric chloride. In both cases, their aqueous solutions are added dropwise for about half an hour with continuous agitation. While initiated, the reaction mixture rapidly turns black and should then be vigorously agitated for 24 hours minimum at 0-5° C. The final product is sedimented by centrifugation and washing with deionized water several times until the aqueous wash medium is no longer cloudy. The product can be additionally doped by excess 0.1M HCl if needed.

Example 14 B (prophetic): Incorporation of the PAN/PPy composite generated by the procedure in Example 14:8.0 g of the PAN/PPy composite from Example 14 can be milled with 32 g of Si to produce a PAN/PPy surface modified Si primary particle. Optionally, the PAN/PPy composite produced from Example 14 could be combined in any weight ratio with surface-modified Si primary particles and about 2 wt % of elastic polymer, such as NBR to make secondary particles. The components can be combined using a circulating media mill under low power for at least 30 minutes to produce a slurry that could be then dried by evaporation of the solvents to form micron-sized secondary particles.

Example 15: Low temperature chemical vapor deposition (LTCVD) was performed on an 8 g sample of secondary particles using pyrrole and ammonium persulfate (APS) or benzoyl peroxide as initiator. An outer coating on the secondary particles was formed by contacting the particles with a pyrrole-saturated nitrogen stream. An initiator was present in the volume of the secondary particle. When the initiator was APS, it was present as 2.5 wt % of the secondary particle matrix and polymerization was allowed to develop by dwelling at 130° C. for 60 minutes while contacting the nitrogen stream saturated with pyrrole at 35° C. and flowing at 50 mL/min. After that, the pyrrole source was bypassed and particles were then heated in the nitrogen stream at a rate of 10° C./min to 290° C., where it was allowed to dwell for another 60 minutes before allowing it to cool back to ambient temperature with continued nitrogen stream flowing at 50 mL/min. This procedure can be repeated by using benzoyl peroxide as the initiator instead of APS. The wt % of benzoyl peroxide was increased to 10 wt % of the weight of the secondary particles.

Example 16: Formation of PPy/PAN composite by mechanochemical processing. 20 g of Br-doped PPy from Example 13 and 20 g of PAN were processed together in a circulating bead mill charged with ~75% volume of 0.5-0.6 mm zirconia ceramic beads for 270 minutes at 13% solids in a non-polar hydrocarbon solvent. Tip speed of the rotor was 12-13 $ms^{-1}$. After evaporating the solvent, the powder was characterized by measuring resistance of a 0.5 mm thick pressed wafer to determine its specific conductivity and characterized by FTIR/ATR.

Figure 14A:
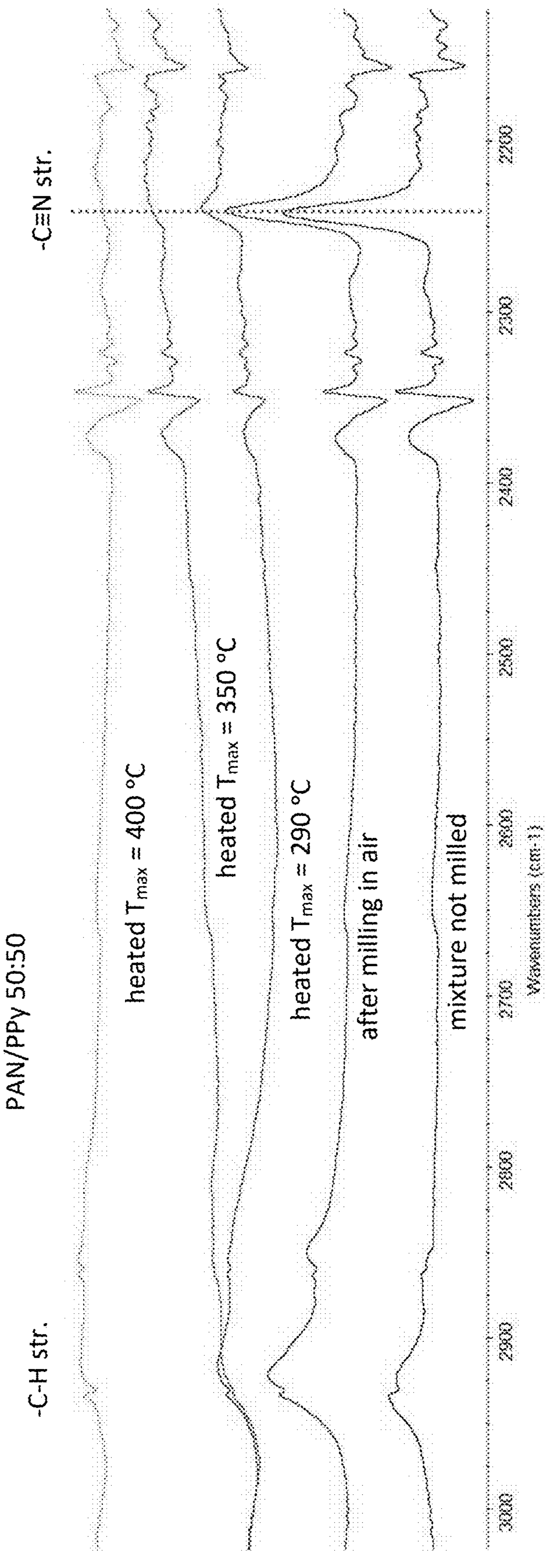
FIG. 14A shows stacked FTIR spectra in the region of the nitrile and C—H stretching bands from the PAN/PPy composite before and after mechanochemical processing. Also shown after processing are the composite spectra unheated and heated to various temperatures.
Figure 14B:
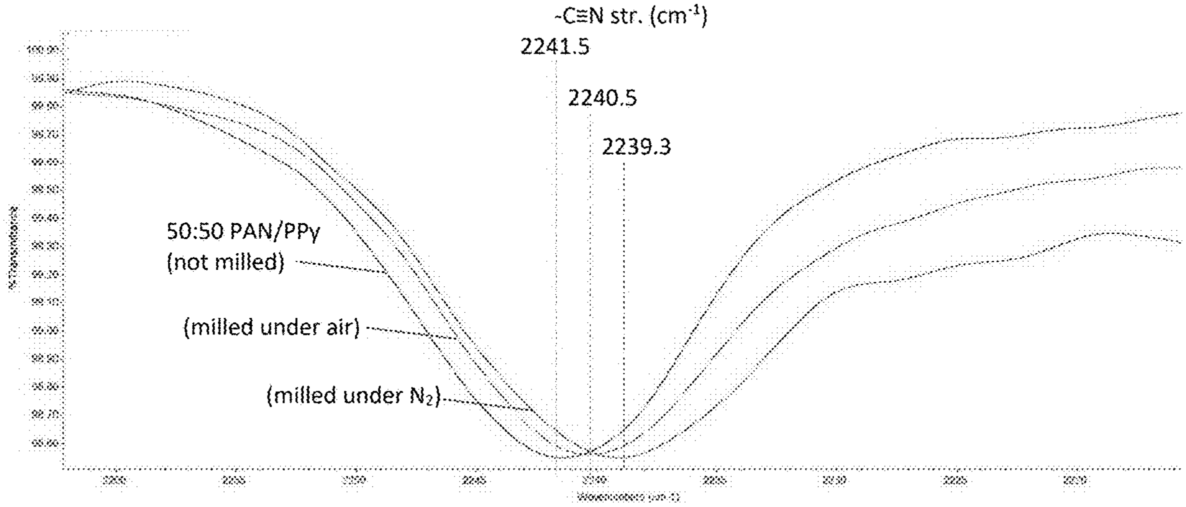
FIG. 14B shows the shift in the —C≡N stretching frequency of 50:50 wt % of mixed versus milled PAN/PPy polymers. All FTIR spectra were measured by attenuated total reflectance (ATR) on a Nicolet iS20 infrared spectrometer.

Example 17: Heat processing of PPy/PAN composite made in Example 16 was conducted and at three temperatures ($T_{max}$) in a rotary furnace under nitrogen purge and the resulting powders were characterized to compare conductivities (Table below) and changes in their FTIR spectra (shown in FIG. 14A and FIG. 14B). The dwell time at $T_{max}$ in each case was 60-180 minutes. The ramp rate to $T_{max}$ was typically 10° C./min.

| 50:50 PAN/PPy | $T_{max}$ (° C.) | Resistance (kΩ) | wafer thickness (mm) | conductivity (S/cm) |
|---|---|---|---|---|
| not milled | 25 | 3,380 | 0.45 | 1.42E−08 |
| milled under $N_2$ (not heated) | 25 | 0.048 | 0.38 | 8.98E−03 |
| milled under air (not heated) | 25 | 3.22 | 0.50 | 1.65E−05 |
| milled under air (heated) | 290 | 1.70 | 0.43 | 2.69E−05 |

-continued

| 50:50 PAN/PPy | $T_{max}$ (° C.) | Resistance (kΩ) | wafer thickness (mm) | conductivity (S/cm) |
|---|---|---|---|---|
| milled under air (heated) | 350 | 3.35 | 0.75 | 2.38E−05 |
| milled under air (heated) | 400 | 0.640 | 0.78 | 1.30E−04 |

Figure 15A:
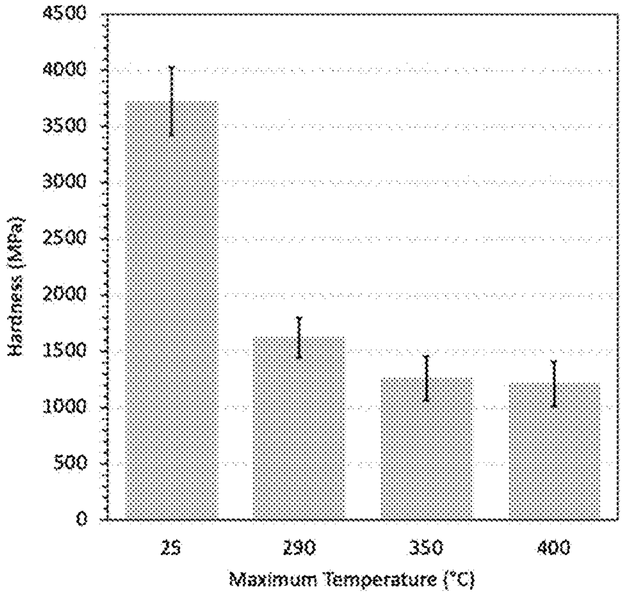
FIG. 15A, FIG. 15B, and FIG. 15C show experimental values for hardness, elastic modulus, and elastic recovery, respectively, for heated and unheated PAN/PPy (50:50) composites made from mechanochemical processing.
Figure 15B:
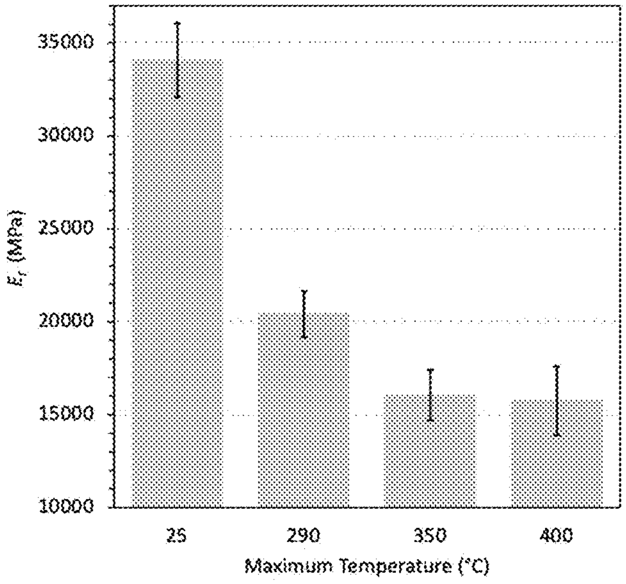
Figure 15C:
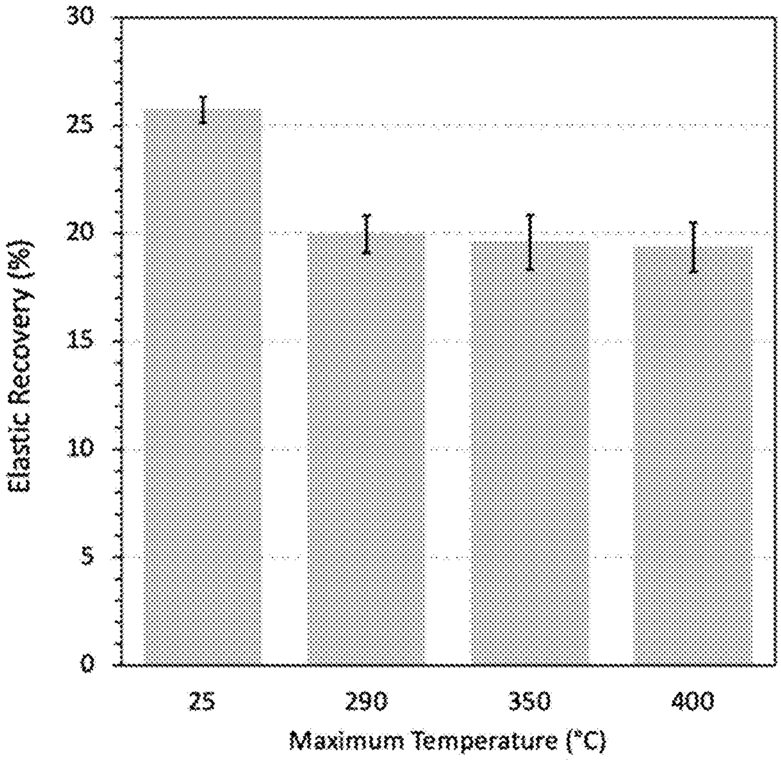

Pressed wafers of approximately 0.5 mm thickness were mounted on an aluminum stub for microindentation measurements. Constant deformation force using a diamond Berkowitz indenter tip was applied while measuring deformation depth. The results are graphically shown in FIG. 15A, FIG. 15B, and FIG. 15C defining properties of hardness, elastic modulus and elastic recovery, respectively. These results show that heat processing caused some degradation of hardness but elastic recovery is mostly preserved while electrical conductivity is dramatically higher for the 50:50 PAN/PPy composites.

Figure 16A:
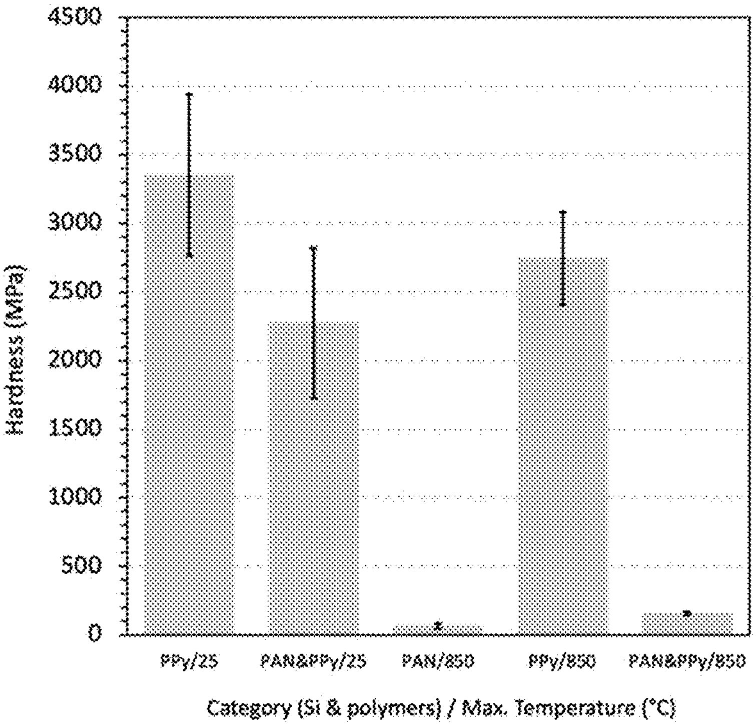
FIG. 16A, FIG. 16B, and FIG. 16C show experimental values for hardness, elastic modulus, and elastic recovery, respectively Si/polymer 80:20 mass ratio where the polymer is PAN, PPy or PAN/PPy unheated and heat processed at 850° C. under nitrogen atmosphere.
Figure 16B:
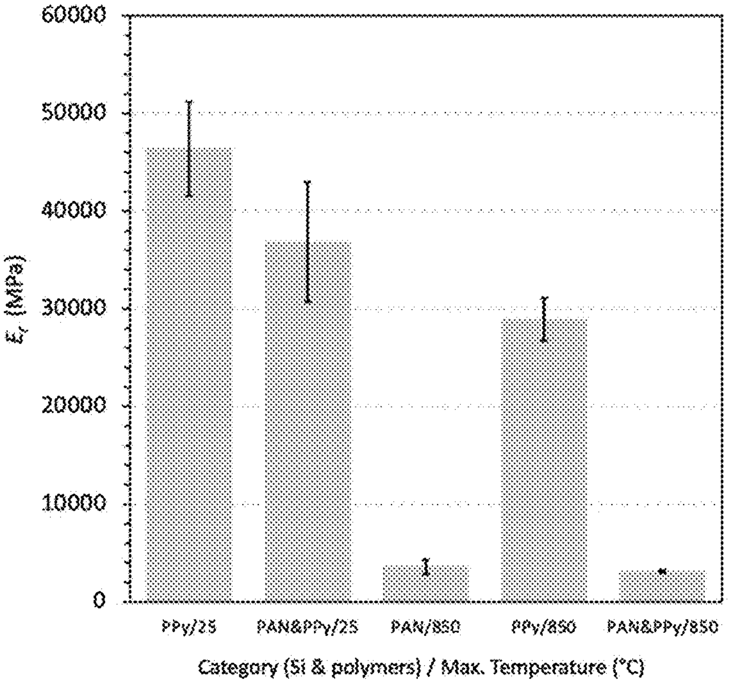
Figure 16C:
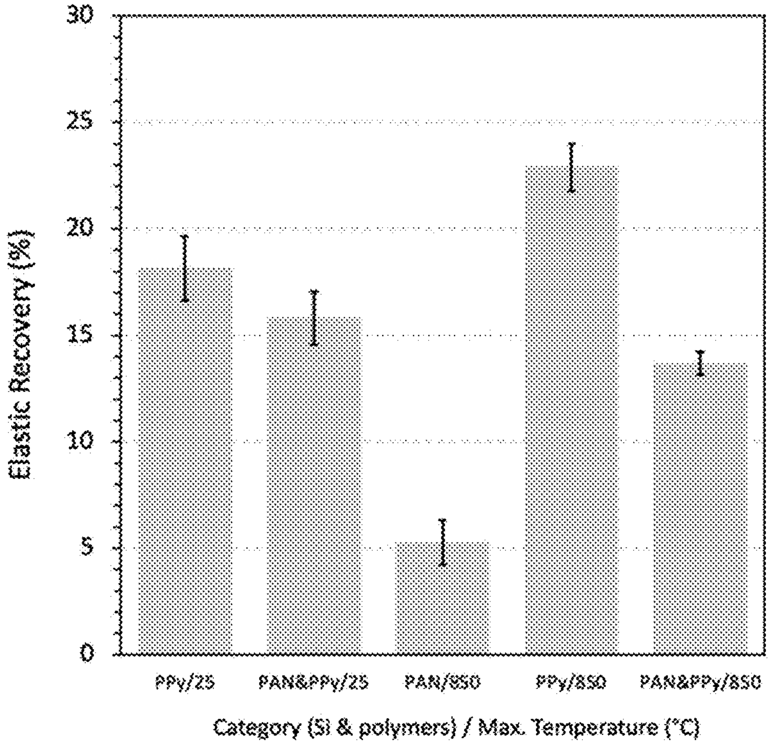

Example 18: Measurement of electrical conductivity and mechanical properties of Si/polymer composites (80:20 wt %) made from micronized Si milled for 275 minutes in a hydrocarbon solvent (cyclohexane) in the presence of the polymer(s): A) 20% PPy; B) 20% PAN; C) 10% PPy+10% PPy. The average particle size distributions (D50) ranged from 125 nm (Si-octene) to ~165 nm for the Si/20% polymer formulations. The vacuum dried powders were then each heat processed under flowing $N_2$ atmosphere at $T_{max}$=850° C. The microindentation measurements from wafers made from these powders were recorded as described in the previous example. The results are graphically represented by FIG. 16A, FIG. 16B, and FIG. 16C showing properties of hardness, elastic modulus and elastic recovery, respectively. The PAN/PPy composites retain hardness and elastic modulus when heated even as high as 850° C. These mechanical properties are comparable to PPy alone, while pure PAN loses much of its mechanical strength and elasticity when heated.

Figure 17:
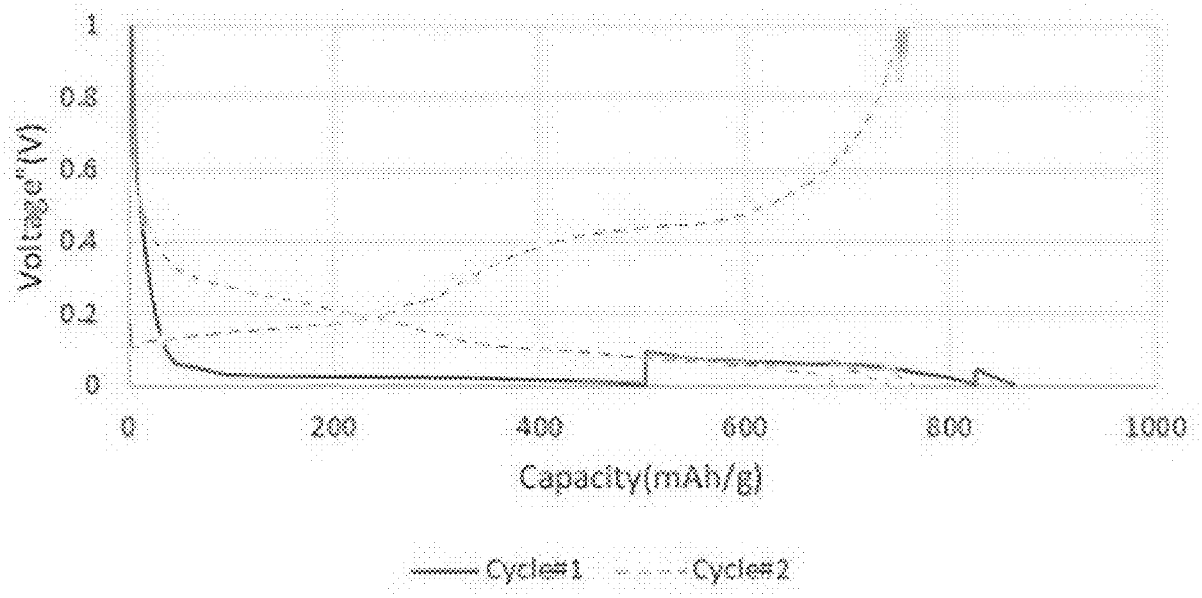
FIG. 17 shows the charging and discharging profiles of a negative electrode half-cell with 20 wt % of the Si product represented by 202 showing discharge capacity of the first and second cycles.

Example 19: Lithiation and delithiation capacity was measured of a negative electrode made with 20% of the product (represented in 202) and graphite paired with a Li counter electrode (FIG. 17). The total discharge capacity of the negative electrode was 758.4 mAh/g or 88.1% efficiency based on the charged capacity of 860.6 mAh/g. Free Si in the Si composite was estimated to be 64 wt %. The discharge capacity of the Si composite active material alone in the electrode is 476 mAh/g or 2380.7 mAh/g for the composite material.

Example 20: FIG. 4A and FIG. 4B shows an example of secondary particle size distributions measured by a Malvern Mastersizer with a dry powder accessory. The results show measurements taken with 0-bar, 1-bar and 2-bar pressure used to disperse dry powder.

The composition shown in FIG. 4A comprises 10 wt % PAN, 2 wt % POE, and 3 wt % PPy. It was observed that there is no stabilizing shell and the polymers are not well dispersed. PAN and PPy are rigid polymers and the matrix was not well bound together with un-modified POE. One problem observed was that the slurry was not as well mixed and homogeneous before drying.

The composition shown in FIG. 4B comprises 10 wt % PAN, 2 wt % POE, and 3 wt % PPy. It was observed that the slurry was well mixed and homogeneous. There was also an outer shell applied before heat processing. The matrix was well bound together mostly because of the better dispersion of the polymer components and better bonding between the polymers.

FIG. 4A demonstrates that a secondary particle with weakly binding polymer matrix can easily break into fine particles when a higher shear energy and/or force is applied (FIG. 4A), while a stronger binding polymer matrix can enhance mechanical stability, which can keep particle integrity intact even under a higher shear energy and/or force (FIG. 4B). The examples in FIG. 4A and FIG. 4B are provided to exemplify how particle size tests can measure durability of the particles to withstand shear forces. It was not necessarily to teach how compositions will affect durability, but rather to show a range of durability.

Figure 6:
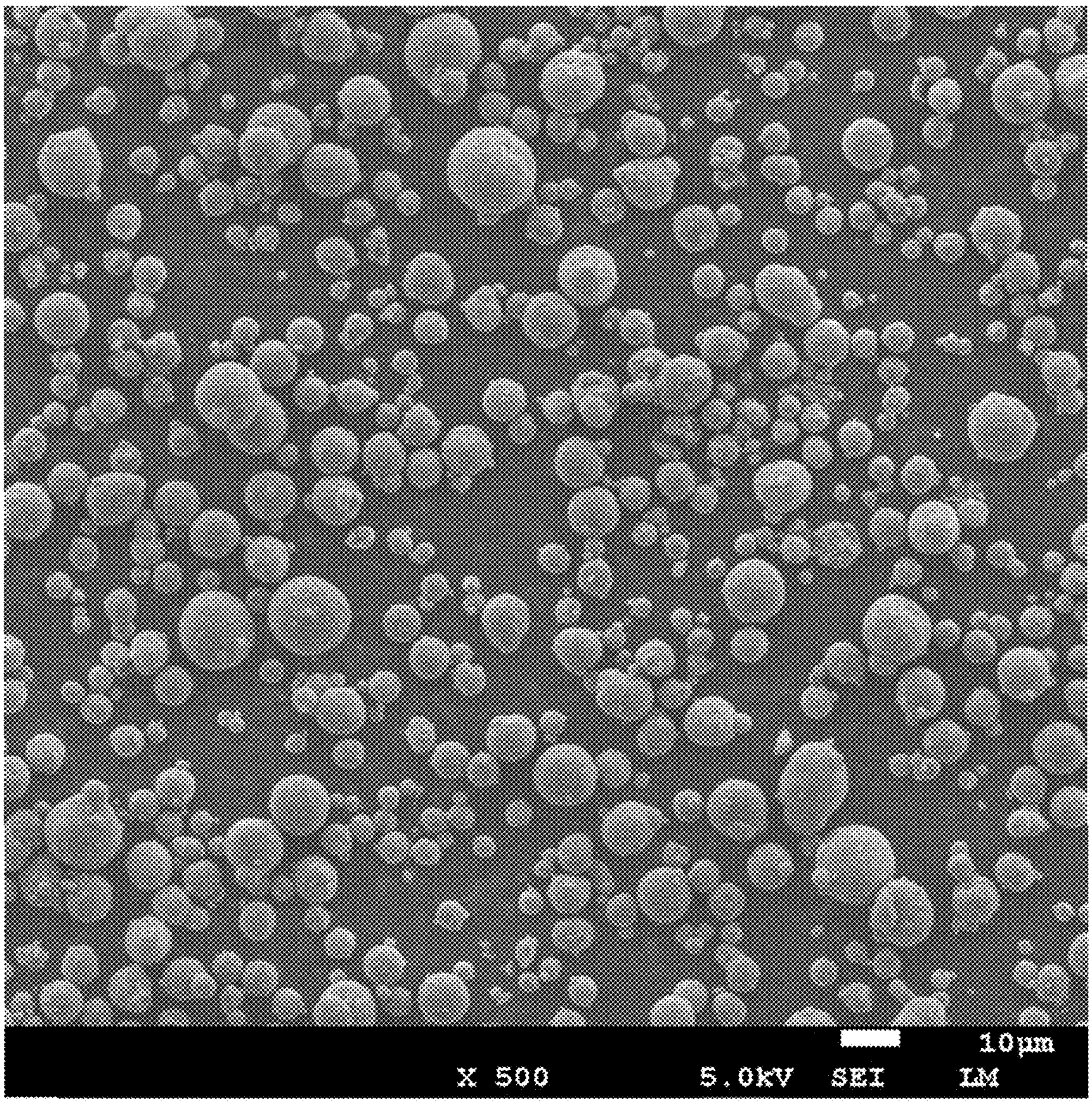
FIG. 6 shows a scanning electron microscopy image of example secondary particles at 500× magnification.

Example 21: Formation of secondary particles comprising passivated nano-Si primary particles formed by mechanochemical processing were combined with asphaltenes (5 wt %) from petroleum pitch in denatured alcohol slurry. The slurry was dried, forming micron-sized particles. The dried powder was heat processed and CVD coated by contacting acetylene at 750° C. FIG. 6 shows a scanning electron microscopy (SEM) image of the exemplary secondary particles, taken at 500× magnification.

The invention claimed is:

1. A secondary particle comprising:

a porous polymer matrix comprising a polyacrylonitrile (PAN)-polypyrrole (PPy) composite, where nitrile groups of PAN are hydrogen bonded to PPy as represented by formula (I) or formula (II), where n is a number of repeating units of PPy and m is a number of repeating units of PAN:

(I)

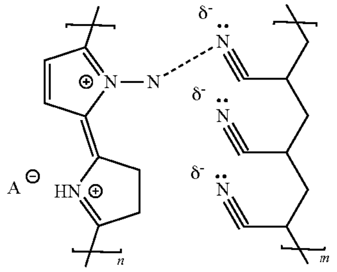

(II)

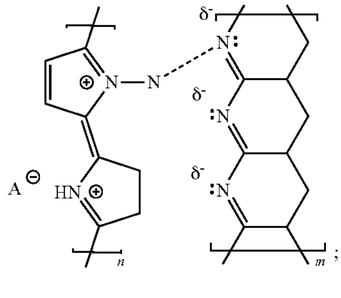

; and at least 1 wt % and no greater than 88 wt % of submicron-sized primary particles dispersed in the porous polymer matrix, the submicron-sized primary particles comprising at least one of: carbon (C), silicon (Si), germanium (Ge), tin (Sn), or an alloy of a Group IVA element, the secondary particle having a Dv50 diameter no less than 3 μm and no greater than 12 μm.

2. The secondary particle according to claim 1, wherein a PAN backbone comprises six-member rings and the PAN-PPy composite is represented by formula (II); and wherein more than 50 wt % of the PPy in the secondary particle is bonded to the PAN.

3. The secondary particle according to claim 1, wherein an average size distribution ($D_v50$) of the primary particle ranges between 20-225 nm; and wherein the submicron-sized primary particle comprises 15-88% of a total weight of the secondary particle.

4. The secondary particle according to claim 1, wherein the porous polymer matrix or a surface of the secondary particle further comprises polyacrylic acid (PAA); and wherein the PAA comprises between 0.5 wt % and 5 wt % of the secondary particle.

5. The secondary particle according to claim 1, wherein the secondary particle has an elastic recovery percentage between 13% and 17%.

6. The secondary particle according to claim 1, wherein the secondary particle has a hardness no less than 150 MPa and no greater than 3000 MPa.

7. The secondary particle according to claim 1, wherein the secondary particle has an elastic recovery no less than 200 MPa and no greater than 42,000 MPa.

8. The secondary particle according to claim 1, wherein the secondary particle has a conductivity between $10^{-3}$ $Sxcm^{-1}$ and $10^{-6}$ $Sxcm^{-1}$.

9. The secondary particle according to claim 1, wherein the secondary particle has an elastic modulus no less than 18,000 MPa and no greater than 22,000 MPa.

10. The secondary particle according to claim 1, wherein the submicron-sized primary particles further comprises a chemically-bonded surface modifier, wherein the chemically-bonded surface modifier is derived from acrylonitrile, pyrrole, polypyrrole, polyacrylonitrile, perfluoroalkylethylenes, acetylene, ethylene, 1-alkenes C12 or less, or 1-alkynes (C12 or less).

11. The secondary particle according to claim 1, further comprising a plurality of bridging segments dispersed within the porous polymer matrix, the plurality of bridging segments is derived from a diene compound, a dinitrile compound, and/or a diazo compound.

12. The secondary particle according to claim 1, further comprising a polymer layer on an exterior surface of the secondary particle, wherein the polymer layer comprises polyacrylonitrile, polyacrylic acid, polypyrrole, cross-linked polyacrylonitrile, cross-linked polypyrrole, or combinations thereof.

13. The secondary particle according to claim 12, wherein the polymer layer comprises a derivative of tetrafluoroethylene monomer.

14. The secondary particle according to claim 1, the porous polymer matrix comprising a plurality of fibral strands linking portions of the porous polymer matrix and defining a plurality of crazes.

15. The secondary particle according to claim 1, wherein an FTIR spectrum of the porous polymer matrix has a —C≡N stretching frequency between 2240.75 $cm^{-1}$ and 2239.0 $cm^{-1}$.

16. A negative electrode, comprising:

active material comprising the secondary particle according to claim 1;

binder; and conductive material.

* * * * *